(12) United States Patent
Yoshida et al.

(10) Patent No.: US 12,483,687 B2
(45) Date of Patent: Nov. 25, 2025

(54) INFORMATION PROCESSING DEVICE AND INFORMATION PROCESSING METHOD

(71) Applicant: SONY GROUP CORPORATION, Tokyo (JP)

(72) Inventors: Akira Yoshida, Tokyo (JP); Ryota Arai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 194 days.

(21) Appl. No.: 17/782,522

(22) PCT Filed: Oct. 23, 2020

(86) PCT No.: PCT/JP2020/040017
§ 371 (c)(1),
(2) Date: Jun. 3, 2022

(87) PCT Pub. No.: WO2021/124680
PCT Pub. Date: Jun. 24, 2021

(65) Prior Publication Data
US 2023/0007232 A1    Jan. 5, 2023

(30) Foreign Application Priority Data
Dec. 18, 2019   (JP) ................................ 2019-228694

(51) Int. Cl.
*H04N 13/383*   (2018.01)
*H04N 13/117*   (2018.01)
(Continued)

(52) U.S. Cl.
CPC ......... *H04N 13/383* (2018.05); *H04N 13/117* (2018.05); *H04N 13/31* (2018.05); *H04S 7/303* (2013.01)

(58) Field of Classification Search
CPC .... H04N 13/383; H04N 13/117; H04N 13/31; H04S 7/303
(Continued)

(56) References Cited

U.S. PATENT DOCUMENTS 7,839,549 B2 * 11/2010 Mihajlovic ............ G02B 30/27
359/23
2008/0226087 A1 * 9/2008 Kinghorn ................ H04S 7/301
381/59
(Continued)

FOREIGN PATENT DOCUMENTS

| JP | 2000-348189 A | 12/2000 |
|---|---|---|
| JP | 2011-071685 A | 4/2011 |

(Continued)

OTHER PUBLICATIONS

International Search Report and Written Opinion of PCT Application No. PCT/JP2020/040017, issued on Dec. 22, 2020, 09 pages of ISRWO.

*Primary Examiner* — Frantz B Jean
(74) *Attorney, Agent, or Firm* — CHIP LAW GROUP

(57) ABSTRACT

Provided is an information processing device that performs processing on a content. An information processing device is provided with an estimation unit that estimates sounding coordinates at which a sound image is generated on the basis of a video stream and an audio stream, a video output control unit that controls an output of the video stream, and an audio output control unit that controls an output of the audio stream so as to generate the sound image at the sounding coordinates. A discrimination unit that discriminates a gazing point of a user who views video and audio is further provided, in which the estimation unit estimates the sounding coordinates at which the sound image of the object gazed by the user is generated on the basis of a discrimination result.

18 Claims, 25 Drawing Sheets

(51) Int. Cl.
*H04N 13/31* (2018.01)
*H04S 7/00* (2006.01)

(58) Field of Classification Search
USPC .......................................................... 348/59
See application file for complete search history.

(56) References Cited

U.S. PATENT DOCUMENTS

2012/0317594 A1* 12/2012 Thorn ................ H04N 21/4223
725/18
2015/0229904 A1 8/2015 Ishikawa et al.
2019/0174247 A1* 6/2019 Hamada ................... H04R 5/02

FOREIGN PATENT DOCUMENTS

| JP | 2011071685 | * | 7/2011 | ............... H04S 5/02 |
| JP | 5618043 B2 | * | 11/2014 | ............... H04R 3/00 |
| JP | 2015-154101 A | | 8/2015 | |
| JP | 6572893 B2 | | 9/2019 | |
| WO | 2018/116580 A1 | | 6/2018 | |

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/040017 filed on Oct. 23, 2020, which claims priority benefit of Japanese Patent Application No. JP 2019-228694 filed in the Japan Patent Office on Dec. 18, 2019. Each of the above-referenced applications is hereby incorporated herein by reference in its entirety.

TECHNICAL FIELD

The technology disclosed in this specification (hereinafter, "the present disclosure") relates to an information processing device and an information processing method that perform processing related to a content viewed by a user.

BACKGROUND ART

Currently, research and development related to a technology for controlling viewing processing of free viewpoint video on the basis of posture information of a viewer wearing a head-mounted display are being conducted. For example, Patent Document 1 discloses a technology enabling viewing of viewpoint video corresponding to a direction of a line of sight of a user by detecting a posture of a head or a body of a viewer and drawing the viewpoint video corresponding to the same.

Furthermore, in recent years, research and development have also been conducted on a technology of combining a display device and a sensing technology to detect a position of an eye and a line of sight of a viewer to perform display processing on a video content. For example, in Patent Document 2, detected eye position and line of sight of a viewer are used for display control of a stereoscopic image. As in these examples, by performing display control of the video on the basis of the detection result of the positional relationship between the viewer and the display video, the expression of the more extended video content is implemented.

CITATION LIST

Patent Document

Patent Document 1: Japanese Patent No. 6572893
Patent Document 2: International Publication No. 2018/116580

SUMMARY OF THE INVENTION

Problems to be Solved by the Invention

An object of the present disclosure is to provide an information processing device and an information processing method that perform processing on the basis of a gazing point of a user for a content.

Solutions to Problems

A first aspect of the present disclosure is
an information processing device provided with:

an estimation unit that estimates sounding coordinates at which a sound image is generated on the basis of a video stream and an audio stream;
a video output control unit that controls an output of the video stream; and
an audio output control unit that controls an output of the audio stream so as to generate the sound image at the sounding coordinates.

The information processing device according to the first aspect is provided with a discrimination unit that discriminates a gazing point of a user who views video and audio. Then, the estimation unit estimates the sounding coordinates at which the sound image of the object gazed by the user is generated on the basis of a discrimination result of the discrimination unit. The discrimination unit discriminates the gazing point of the user on the basis of a result of detecting a state related to the user.

Furthermore, the video output control unit performs rendering of video including at least one of framing or zooming processing of the video on the basis of a result of discriminating a gazing degree of the user. The video output control unit performs the rendering on the basis of a result of tracking the object gazed by the user.

Furthermore, the information processing device according to the first aspect is provided with an acquisition unit that acquires related information of the object discriminated on the basis of a feature of the object corresponding to the gazing point, and a related information output control unit that controls an output of the acquired related information. Then, the video output control unit controls to output the related information together with the video stream.

Furthermore, a second aspect of the present disclosure is
an information processing method provided with:
an estimation step of estimating sounding coordinates at which a sound image is generated on the basis of a video stream and an audio stream;
a video output control step of controlling an output of the video stream; and
an audio output control step of controlling an output of the audio stream so as to generate the sound image at the sounding coordinates.

Effects of the Invention

According to the present disclosure, it is possible to provide an information processing device and an information processing method that perform reproduction control of a content based on a gazing point of a user using artificial intelligence.

Note that, the effect described in this specification is illustrative only and the effect by the present invention is not limited to this. Furthermore, there also is a case in which the present disclosure further has an additional effect in addition to the above-described effect.

Still another object, feature, and advantage of the present disclosure will become clear by further detailed description with reference to an embodiment to be described later and the attached drawings.

MODE FOR CARRYING OUT THE INVENTION

An embodiment according to the present disclosure is hereinafter described in detail with reference to the drawings.

A. System Configuration

Figure 1:
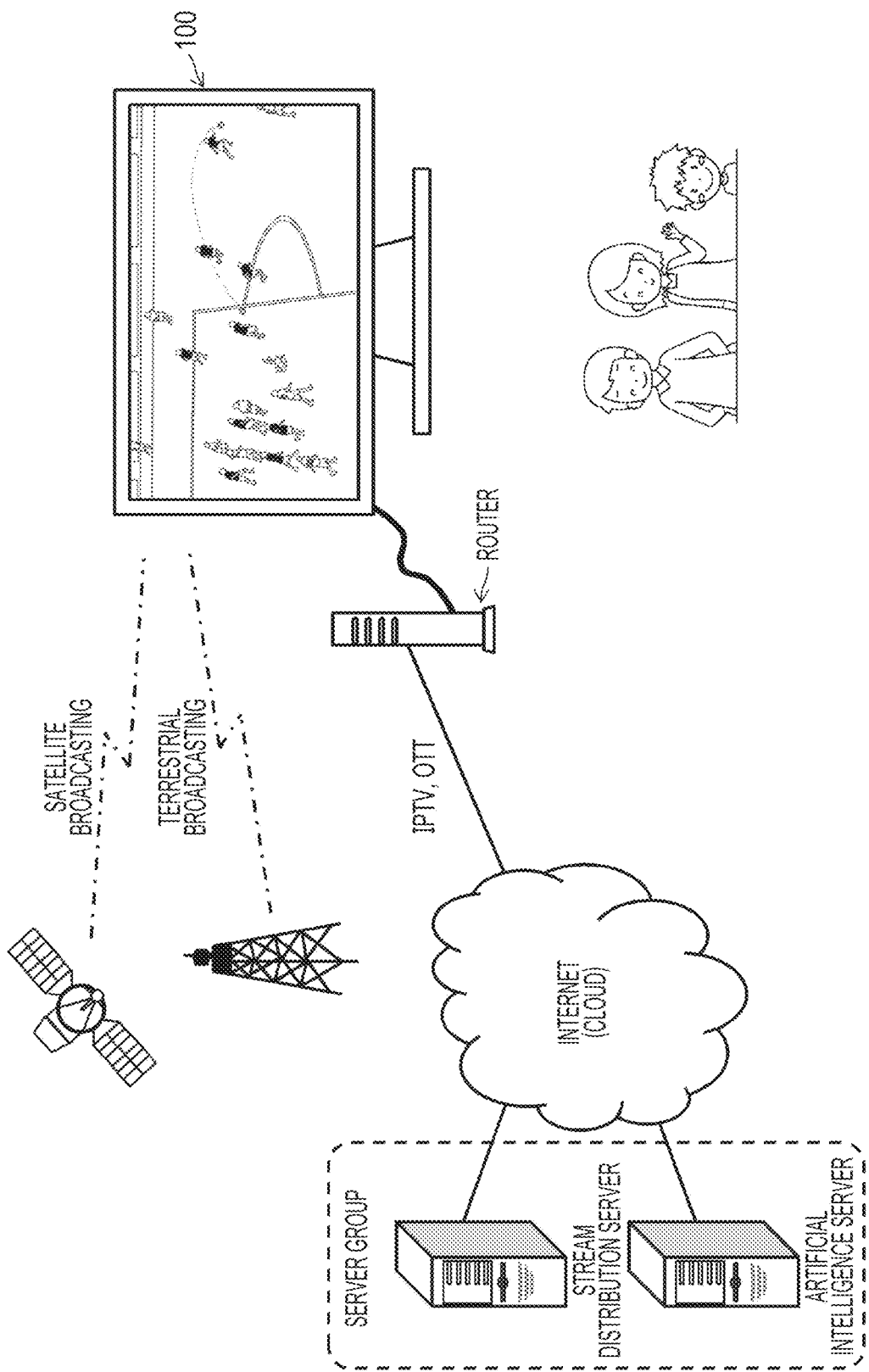
FIG. 1 is a view illustrating a configuration example of a system for viewing a video content.

FIG. 1 schematically illustrates a configuration example of a system for viewing a video content.

A content reproduction device 100 is, for example, a television receiver installed in a living room where a family has a happy family circle, a private room of a user and the like in a home. Note that, the content reproduction device 100 is not necessarily limited to a stationary device such as the television receiver, and may be, for example, a small or portable device such as a personal computer, a smartphone, a tablet, and a head-mounted display. Furthermore, in this embodiment, unless otherwise specified, the simple term "user" refers to a viewer who views a video content displayed on the content reproduction device 100 (including a case where the viewer has a plan to view).

The content reproduction device 100 is equipped with a display that displays the video content and a speaker that outputs a sound. The content reproduction device 100 includes, for example, a built-in tuner for selecting and receiving a broadcast signal, or an externally-connected set top box having a tuner function, and may use a broadcast service provided by a television station. The broadcast signal may be either a terrestrial wave or a satellite wave.

Furthermore, the content reproduction device 100 may also use a moving image distribution service using a network such as IPTV, OTT, or a moving image sharing service, for example. Therefore, the content reproduction device 100 is equipped with a network interface card, and is interconnected to an external network such as the Internet via a router or an access point using communication based on an existing communication standard such as Ethernet (registered trademark) or Wi-Fi (registered trademark). The content reproduction device 100 also is, in a functional aspect thereof, a content acquisition device, a content reproduction device, or a display device equipped with a display having a function of acquiring or reproducing various types of contents to acquire various reproduction contents such as video and audio by streaming or downloading via a broadcast wave or the Internet to present to the user. Furthermore, although not illustrated, a medium reproduction device is connected to the content reproduction device 100 via a high-definition multimedia interface (HDMI (registered trademark)) interface, and a content reproduced from a recording medium such as a hard disk drive (HDD) or Blu-ray is input thereto.

A stream distribution server that distributes video streams is installed on the Internet, and provides a broadcast type moving image distribution service to the content reproduction device 100.

Furthermore, an infinite number of servers that provide various services are installed on the Internet. An example of the server is, for example, a stream distribution server that provides a distribution service of moving image streams using a network such as IPTV, OTT, and a moving image sharing service. A side of the content reproduction device 100 may activate a browser function, and issue a hyper text transfer protocol (HTTP) request, for example, to the stream distribution server, thereby using the stream distribution service.

Furthermore, in this embodiment, it is assumed that there also is an artificial intelligence server that provides a function of artificial intelligence to a client on the Internet (alternatively, on a cloud). The artificial intelligence is, for example, a function of artificially implementing, by software or hardware, a function exhibited by a human brain such as learning, inference, data creation, and planning. The function of the artificial intelligence may be implemented using a machine learning model represented by a neural network that simulates a human cranial nerve circuit.

The machine learning model is a calculation model having variability used for the artificial intelligence that changes a model structure through learning (training) accompanied with an input of learning data. In the neural network, in a case of using a brain-type (neuromorphic) computer, a node is also referred to as an artificial neuron (or simply "neuron") via a synapse. The neural network has a network structure formed by connection between nodes (neurons), and generally includes an input layer, a hidden layer, and an output layer. Learning of the machine learning model represented by the neural network is performed through processing of changing the neural network by inputting data (learning data) to the neural network to perform learning of a connection degree (hereinafter, also referred to as a "connection weight coefficient") between the nodes (neurons). By using a learned machine learning model, an optimal solution (output) for a question (input) may be estimated. The machine learning model is handled as, for example, set data of the connection weight coefficients between the nodes (neurons).

Here, the neural network may have various algorithms, forms, and structures according to purposes such as a convolutional neural network (CNN), a recurrent neural network (RNN), a generative adversarial network, a variational autoencoder, a self-organizing feature map, and a spiking neural network (SNN), and they may be combined in any manner.

The artificial intelligence server applied to the present disclosure is assumed to be equipped with a multi-stage neural network capable of performing deep learning (DL). In a case of performing deep learning, the number of learning data and the number of nodes (neurons) are also large. Therefore, it is considered appropriate to perform deep learning using huge computer resources such as the cloud.

The "artificial intelligence server" mentioned in this specification is not limited to a single server device, and may have, for example, a form of the cloud that provides a cloud computing service to the user via another device, and outputs and provides a service result (product) to the other device.

Furthermore, a "client" (hereinafter, also referred to as a terminal, a sensor device, or an edge device) in this specification is at least characterized in downloading from the artificial intelligence server the machine learning model learning of which is finished by the artificial intelligence server as the result of the service by the artificial intelligence server to perform processing such as inference and object detection using the downloaded machine learning model, or receiving sensor data inferred by the artificial intelligence server using the machine learning model as the product of the service to perform processing such as inference and object detection. The client may further have a learning function using a relatively small-scale neural network, thereby performing deep learning in cooperation with the artificial intelligence server.

Note that, the above-described technology of the brain-type computer and the technology of other artificial intelligence are not independent from each other, and may be used in cooperation with each other. For example, a representative technology in the neuromorphic computer includes SNN (described above). By using the SNN technology, output data from an image sensor and the like, for example, may be used as data provided as an input of deep learning in a format differentiated along time axis on the basis of input data series. Therefore, in this specification, unless otherwise specified, the neural network is handled as a type of the technology of the artificial intelligence using the brain-type computer technology.

B. Device Configuration

Figure 2:
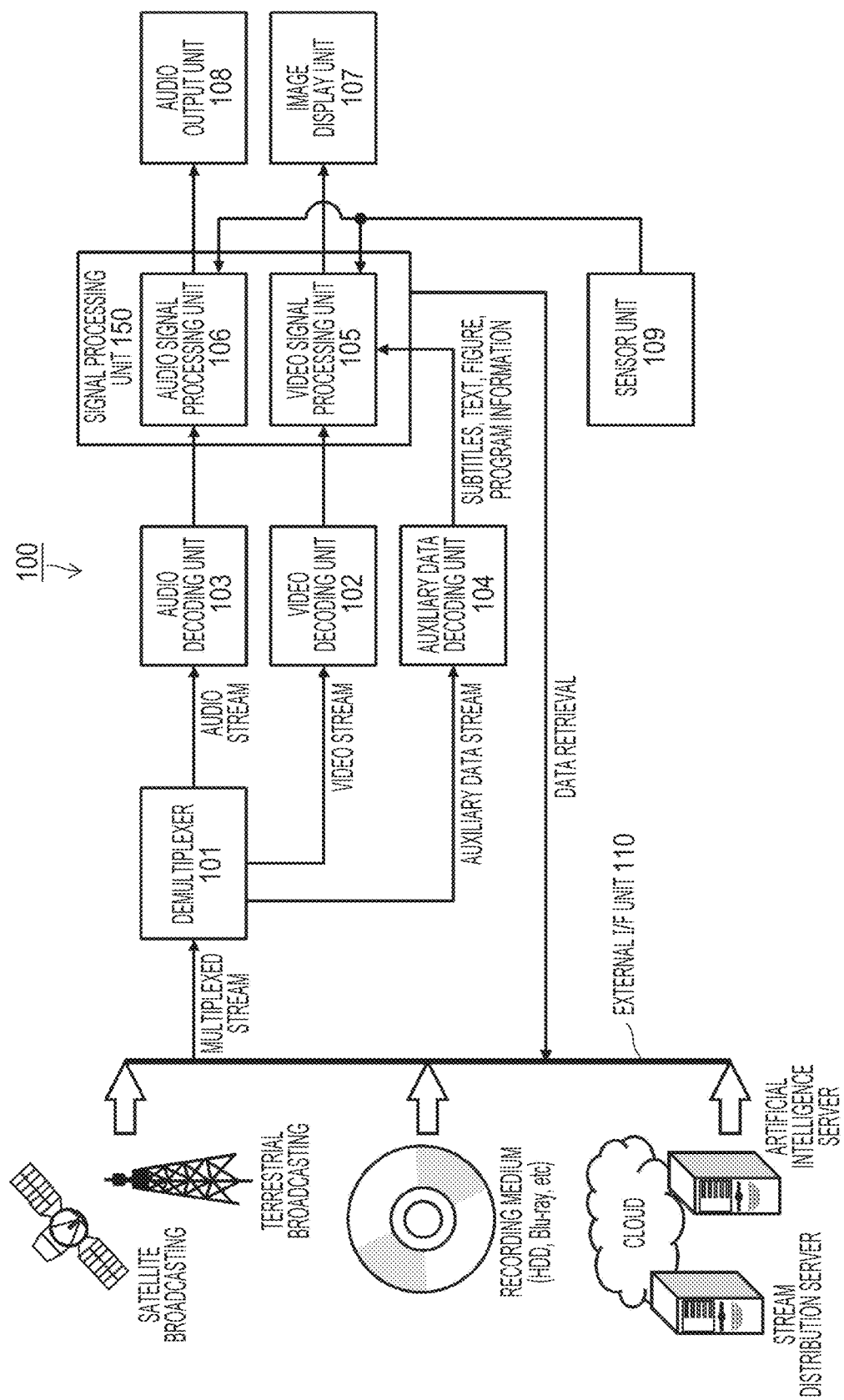
FIG. 2 is a view illustrating a configuration example of a content reproduction device 100.

FIG. 2 illustrates a configuration example of the content reproduction device 100. The illustrated content reproduction device 100 is provided with an external interface unit 110 that performs data exchange with the outside, such as reception of the content. The external interface unit 110 herein mentioned is equipped with a tuner for selecting and receiving a broadcast signal, an HDMI (registered trademark) interface for inputting a reproduction signal from a medium reproduction device, and a network interface (NIC) for connecting to a network, and has functions such as data reception from a medium such as broadcasting and the cloud, and reading and retrieval of data from the cloud.

The external interface unit 110 has a function of acquiring the content provided to the content reproduction device 100. As a mode in which the content is provided to the content reproduction device 100, the broadcast signal of terrestrial broadcasting, satellite broadcasting and the like, the reproduction signal reproduced from the recording medium such as the hard disk drive (HDD) or Blu-ray, a streaming content distributed from the stream distribution server on the cloud and the like is assumed. The broadcast type moving image distribution service using the network may include IPTV, OTT, the moving image sharing service and the like. Then, these contents are supplied to the content reproduction device 100 as a multiplexed bit stream obtained by multiplexing bit streams of respective media data such as video, audio, and auxiliary data (subtitles, text, graphics, program information and the like). In the multiplexed bit stream, for example, it is assumed that data of respective media such as video and audio are multiplexed in compliance with the MPEG-2 Systems standard.

Note that, the video streams provided from the broadcasting station, the stream distribution server, or the recording medium are assumed to include both 2D and 3D. The 3D video may be free viewpoint video. The 2D video may include a plurality of videos imaged from a plurality of viewpoints. Furthermore, it is assumed that audio streams provided from the broadcasting station, the stream distribution server, or the recording medium include object-based audio in which individual sounding objects are not mixed.

Furthermore, in this embodiment, it is assumed that the external interface unit 110 acquires a machine learning model learning of which is performed by deep learning and the like by the artificial intelligence server on the cloud. For example, the external interface unit 110 acquires the machine learning model for video signal processing and the machine learning model for audio signal processing (to be described later).

The content reproduction device 100 is provided with a demultiplexer 101, a video decoding unit 102, an audio decoding unit 103, an auxiliary data decoding unit 104, a video signal processing unit 105, an audio signal processing unit 106, an image display unit 107, and an audio output unit 108. Note that, the content reproduction device 100 may be a terminal device such as a set top box and configured to process the received multiplexed bit stream and output processed video and audio signals to another device provided with the image display unit 107 and the audio output unit 108.

The demultiplexer 101 demultiplexes the multiplexed bit stream externally received as the broadcast signal, reproduction signal, or streaming data into a video bit stream, an audio bit stream, and an auxiliary bit stream, and distributes them to the video decoding unit 102, the audio decoding unit 103, and the auxiliary data decoding unit 104, respectively, on a subsequent stage.

The video decoding unit 102 decodes, for example, an MPEG-encoded video bit stream, and outputs a baseband video signal. Note that, it is also conceivable that the video signal output from the video decoding unit 102 is low resolution or standard resolution video, or low dynamic range (LDR) or standard dynamic range (SDR) video.

The audio decoding unit 103 decodes the audio bit stream encoded by an encoding system such as MPEG Audio Layer 3 (MP3) or High Efficiency MPEG4 Advanced Audio Coding (HE-AAC), for example, and outputs a baseband audio signal. Note that, the audio signal output from the audio decoding unit 103 is assumed to be a low resolution or standard resolution audio signal in which a partial band such as a high range is removed or compressed.

The auxiliary data decoding unit 104 decodes the encoded auxiliary bit stream and outputs the subtitles, text, graphics, program information and the like.

The content reproduction device 100 is provided with a signal processing unit 150 that performs signal processing and the like of the reproduction content. The signal processing unit 150 includes the video signal processing unit 105 and the audio signal processing unit 106.

The video signal processing unit 105 applies video signal processing to the video signal output from the video decoding unit 102 and the subtitles, text, graphics, program information and the like output from the auxiliary data decoding unit 104. The video signal processing herein mentioned may include image quality enhancement processing such as noise reduction, resolution conversion processing such as super resolution processing, dynamic range conversion processing, and gamma processing. In a case where the video signal output from the video decoding unit 102 is the low resolution or standard resolution video or the low dynamic range or standard dynamic range video, the video signal processing unit 105 performs the image quality enhancement processing such as super resolution processing of generating a high resolution video signal from a low resolution or standard resolution video signal, dynamic range expansion and the like. The video signal processing unit 105 may perform the video signal processing after synthesizing the video signal of a main story output from the video decoding unit 102 and the auxiliary data such as the subtitles output from the auxiliary data decoding unit 104, or may perform synthesis processing after individually performing the image quality enhancement processing on the video signal of the main story and the auxiliary data. In any case, the video signal processing unit 105 performs the video signal processing such as the super resolution processing and dynamic range expansion within a range of screen resolution or a luminance dynamic range allowed by the image display unit 107, which is an output destination of the video signal.

Furthermore, the video signal processing unit 105 further performs processing such as tracking, framing, and zooming of a specific object on the video on the basis of a gazing point of the user and the like. The framing may include processing such as viewpoint switching and line-of-sight change.

In this embodiment, the video signal processing unit 105 is assumed to perform the video signal processing as described above by the machine learning model. It is expected to implement optimal video signal processing by using the machine learning model preliminary learning of which by deep learning is performed by the artificial intelligence server on the cloud.

The audio signal processing unit 106 applies audio signal processing to the audio signal output from the audio decoding unit 103. The audio signal output from the audio decoding unit 103 is a low resolution or standard resolution audio signal in which a partial band such as a high range is removed or compressed. The audio signal processing unit 106 may perform sound quality enhancement processing of performing band extension of the low resolution or standard resolution audio signal to a high resolution audio signal including a removed or compressed band. Furthermore, the audio signal processing unit 106 performs processing of applying effects such as reflection, diffraction, and interference of an output sound. Furthermore, the audio signal processing unit 106 may perform sound image localization processing using a plurality of speakers in addition to sound quality enhancement such as band extension. The sound image localization processing is implemented by determining a direction and a volume of the sound at a position of a sound image to be localized (hereinafter, also referred to as "sounding coordinates") and determining a combination of the speakers for generating the sound image and directivity and volume of each speaker. Then, the audio signal processing unit 106 outputs the audio signal from each speaker.

Note that, the audio signal handled in this embodiment may be "object-based audio" obtained by supplying individual sounding objects without mixing and rendering on a reproduction device side. In the object-based audio, data of the object-based audio includes a waveform signal for the sounding object (object as a sound source in a video frame (an object hidden from the video may be included) and localization information of the sounding object represented by a relative position from a listening position as a predetermined reference as meta information. The wave signal of the sounding object is rendered to audio signals of the desired number of channels by vector based amplitude panning (VBAP), for example, on the basis of the meta information to be reproduced. The audio signal processing unit 106 may designate the position of the sounding object by using the audio signal conforming to the object-based audio, and easily implement more robust stereophonic sound.

In this embodiment, it is assumed that the audio signal processing unit 106 performs the audio signal processing such as the band extension, effects, and sound image localization by the machine learning model. It is expected to implement optimal audio signal processing by using the machine learning model preliminary learning of which by deep learning is performed by the artificial intelligence server on the cloud.

Furthermore, a single machine learning model that performs the video signal processing and audio signal processing together may be used in the signal processing unit 150. For example, in a case of performing processing such as tracking, framing (including viewpoint switching and line-of-sight change), and zooming of an object as the video signal processing using the machine learning model in the signal processing unit 150 (as described above), the sound image position may be controlled in conjunction with the change in position of the object in the frame.

The image display unit 107 presents a screen on which video subjected to the video signal processing such as image quality enhancement by the video signal processing unit 105 is displayed to the user (the viewer of the content and the like). The image display unit 107 is a display device including, for example, a liquid crystal display, an organic electro-luminescence (EL) display, a self-luminous display using fine light emitting diode (LED) elements as pixels or the like.

Furthermore, the image display unit 107 may be a display device to which a partial driving technology of dividing the screen into a plurality of areas and controlling brightness for each area is applied. In a case of the display using a transmissive liquid crystal panel, luminance contrast may be improved by brightly lighting a backlight corresponding to an area with a high signal level and darkly lighting a backlight corresponding to an area with a low signal level. In this type of partial driving display device, it is possible to implement a high dynamic range by increasing the luminance in a case where white display is partially performed (while keeping output power of an entire backlight constant) by further utilizing a push-up technology of allocating power suppressed in a dark portion to the area with a high signal level to intensively emit light.

Alternatively, the image display unit 107 may be a 3D display or a display capable of switching between 2D video display and 3D video display. Furthermore, the 3D display may be a display provided with a screen enabling stereoscopic viewing, such as a 3D display with naked eyes or glasses, a holographic display enabling viewing of different videos according to a line-of-sight direction and improving depth perception, or a light-field display. Note that, examples of the naked-eye 3D display include, for example, a display using binocular parallax such as a parallax barrier system or a lenticular lens system, and a multilayer display (MLD) that enhances a depth effect using a plurality of liquid crystal displays. In a case where the 3D display is used for the image display unit 107, the user may enjoy stereoscopic video, so that a more effective viewing experience may be provided.

Alternatively, the image display unit 107 may be a projector (or a movie theater that projects video using a projector). A projection mapping technique of projecting video on a wall surface having any shape or a projector stacking technique of superimposing projection videos of a plurality of projectors may be applied to the projector. If the projector is used, the video may be enlarged to be displayed on a relatively large screen, so that there is an advantage that the same video may be simultaneously presented to a plurality of persons. The audio output unit 108 outputs audio subjected to the audio signal processing such as sound quality enhancement by the audio signal processing unit 106. The audio output unit 108 includes a sound generating element such as a speaker. For example, the audio output unit 108 may be a speaker array (multichannel speaker or super-multichannel speaker) obtained by combining a plurality of speakers.

In addition to a cone speaker, a flat-panel speaker may be used as the audio output unit 108. It goes without saying that a speaker array obtained by combining different types of speakers may be used as the audio output unit 108. Furthermore, the speaker array may include one that performs audio output by vibrating the image display unit 107 by one or more vibrators (actuators) that generate vibration. The vibrator (actuator) may be retrofitted to the image display unit 107.

Furthermore, a part or all of the speakers forming the audio output unit 108 may be externally connected to the content reproduction device 100. The external speaker may be installed in front of a television as with a sound bar, or may be wirelessly connected to the television as with a wireless speaker. Furthermore, the speaker may be connected to another audio product via an amplifier and the like. Alternatively, the external speaker may be a smart speaker equipped with a speaker to which audio may be input, a wired or wireless headphone/headset, a tablet, a smartphone, a personal computer (PC), or a so-called smart home appliance such as a refrigerator, a washing machine, an air conditioner, a vacuum cleaner, or a lighting fixture, or an Internet of things (IoT) home appliance.

In a case where the audio output unit 108 is provided with a plurality of speakers, sound image localization may be performed by individually controlling the audio signals output from a plurality of output channels, respectively. Furthermore, by increasing the number of channels and multiplexing the speakers, it is possible to control a sound field with high resolution. For example, it is possible to generate a sound image at desired sounding coordinates by using a plurality of directional speakers in combination or arranging a plurality of speakers in an annular shape and adjusting a direction and volume of sound emitted from each speaker.

Figure 3:
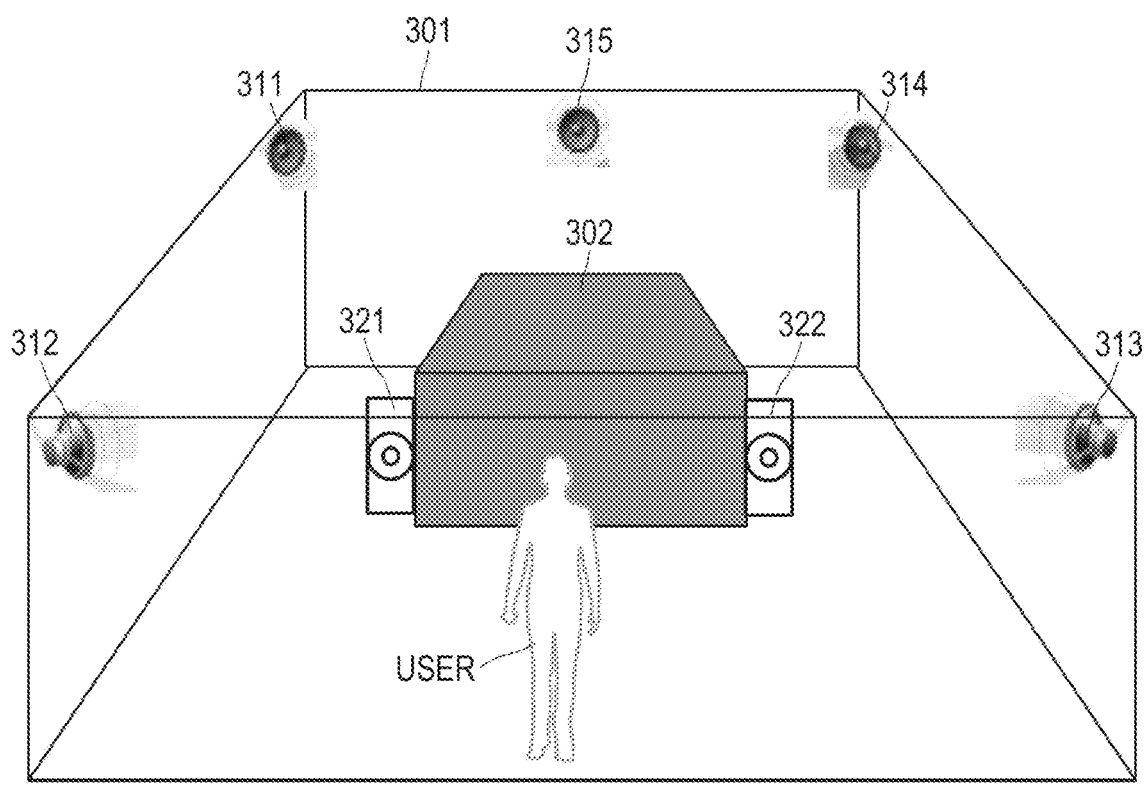
FIG. 3 is a view illustrating an example of a content viewing environment in which a 3D display and a sound image localization technology are combined.

FIG. 3 illustrates an example of a content viewing environment in which a 3D display and a sound image localization technology are combined. Under the illustrated environment, a 3D display 302 is arranged in an interior 301 serving as the content viewing environment. Furthermore, it is assumed that a plurality of directional speakers 311 to 315 is arranged so as to surround the user who views the content. Furthermore, directional speakers 321 and 322 are also arranged on left and right sides of the 3D display 302. For example, the speakers 311 to 315 are used for outputting space sound, and the speakers 321 and 322 are used for outputting stage sound. Furthermore, it is possible to generate a sound image at desired sounding coordinates by changing the combination of the speakers that output or adjusting the direction and volume of the sound emitted from each speaker. Note that, FIG. 3 is an example schematically illustrating the arrangement of the speakers, and there is no limitation. Furthermore, a non-directional speaker may also be arranged in place of the directional speaker.

As the 3D display 302, a display with improved depth perception such as a holographic display is assumed. In the illustrated example, video in which an object (person) 302 moves in the 3D space 301 is displayed. The user may view different videos according to a line-of-sight direction of viewing the 3D space displayed by the 3D display 302. Furthermore, it is also assumed that the user moves in the interior 301 while viewing the 3D video in order to change the line-of-sight direction of viewing the 3D space. When an object (audio object) serving as a sound source such as a performer of a drama moves in the 3D space, the sound image localization processing is executed in synchronization with a position where the object moves, and a sound image of voice uttered by the object at each time is localized at a position where the object is present at that time. Furthermore, a volume of the sound image of the object is controlled according to a distance between the user who moves in the interior 301 and the audio object (for example, when the object comes to a near side of the user in the 3D space, the volume of the voice increases, and when the object moves backward in the 3D space, the volume of the voice decreases).

The configuration of the content reproduction device 100 is continuously described with reference to FIG. 2 again.

A sensor unit 109 includes both a sensor provided inside a main body of the content reproduction device 100 and a sensor externally connected to the content reproduction device 100. The externally connected sensor also includes a sensor built in another consumer electronics (CE) device or IoT device present in the same space as the content reproduction device 100. In this embodiment, it is assumed that sensor information acquired from the sensor unit 109 becomes input information of the neural network used in the video signal processing unit 105 and the audio signal processing unit 106. Note that, the neural network is described later in detail.

C. Sensing Function

Figure 4:
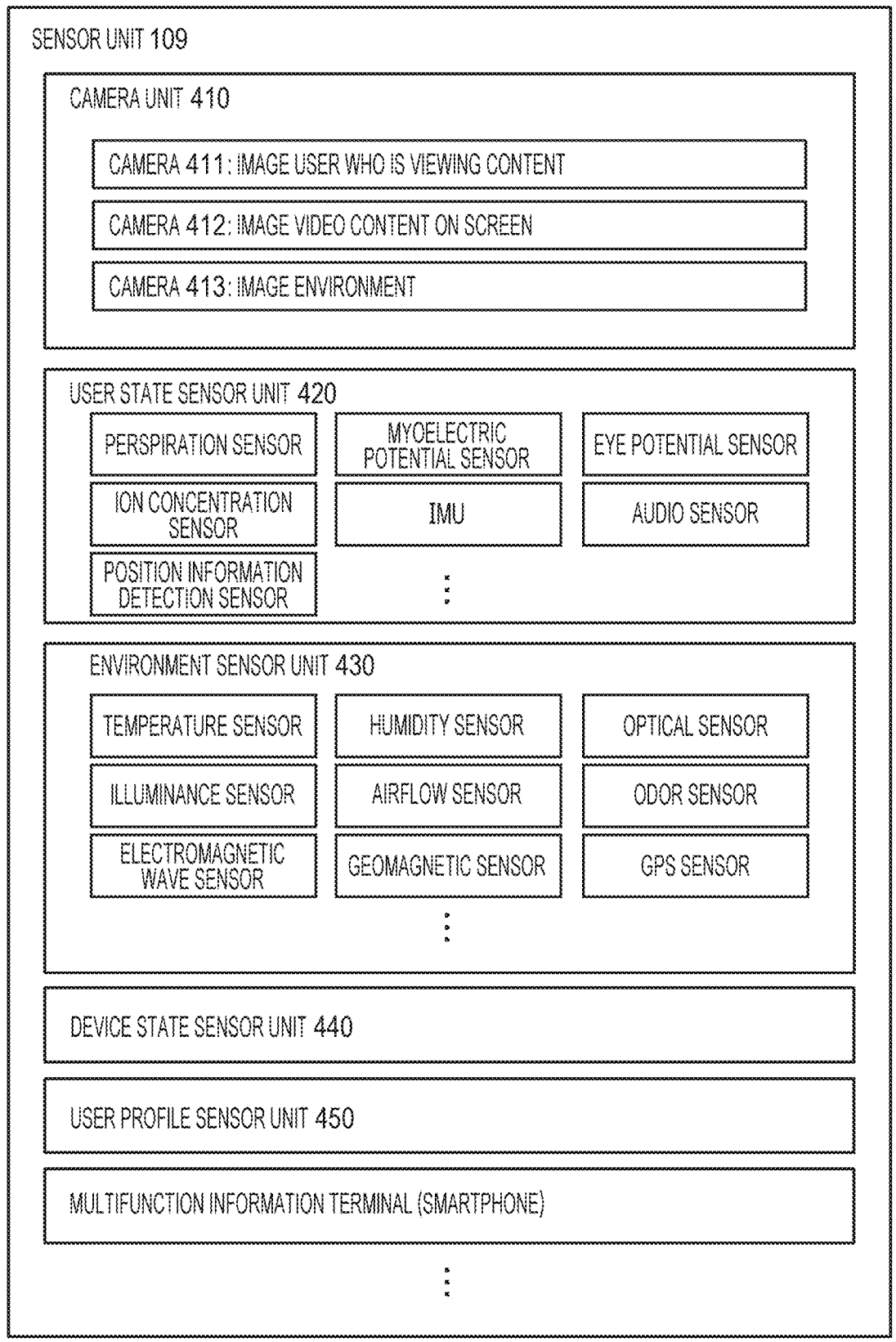
FIG. 4 is a view illustrating a configuration example of a sensor unit 109.

FIG. 4 schematically illustrates a configuration example of the sensor unit 109 mounted on the content reproduction device 100. The sensor unit 109 includes a camera unit 410, a user state sensor unit 420, an environment sensor unit 430, a device state sensor unit 440, and a user profile sensor unit 450. In this embodiment, the sensor unit 109 is used to acquire various pieces of information regarding a viewing status of the user.

The camera unit 410 includes a camera 411 that images the user who is viewing the video content displayed on the image display unit 107, a camera 412 that images the video content displayed on the image display unit 107, and a camera 413 that images an interior (or an installation environment) in which the content reproduction device 100 is installed.

The camera 411 is installed, for example, in the vicinity of the center of an upper edge of a screen of the image display unit 107, and suitably images the user who is viewing the video content. The camera 412 is installed, for example, so as to face the screen of the image display unit 107, and images the video content that the user is viewing. Alternatively, the user may wear goggles equipped with the camera 412. Furthermore, the camera 412 has a function of recording the voice of the video content together. Furthermore, the camera 413 includes, for example, a whole-sky camera or a wide-angle camera, and images the interior (or the installation environment) in which the content reproduction device 100 is installed. Alternatively, the camera 413 may be, for example, a camera mounted on a camera table (camera platform) rotatable about each axis of roll, pitch, and yaw. Note that, in a case where sufficient environment data may be acquired by the environment sensor 430 or in a case where the environment data itself is unnecessary, the camera 410 is unnecessary.

The user state sensor unit 420 includes one or more sensors that acquire state information regarding a state of the user. The user state sensor unit 420 intends to acquire, as the state information, for example, a work state of the user (whether or not the user views the video content), an action state of the user (moving state such as a stationary, walking, or running state, an opening/closing state of eyelids, a line-of-sight direction, a size of pupil), a mental state (a degree of impression, a degree of excitement, a degree of wakefulness as to whether the user is immersed or concentrated in the video content, feelings, emotions and the like), and a physiological state. The user state sensor unit 420 may be provided with various sensors such as a perspiration sensor, a myoelectric potential sensor, an eye potential sensor, a brain wave sensor, an exhalation sensor, a gas sensor, an ion concentration sensor, and an inertial measurement unit (IMU) that measures a behavior of the user, an audio sensor (such as a microphone) that collects the utterance of the user, and a position information detection sensor (such as a proximity sensor) that detects a position of an object such as a finger of the user. Note that, the microphone is not necessarily integrated with the content reproduction device 100, and may be a microphone mounted on a product installed in front of a television such as a sound bar. Furthermore, an external microphone mounted device connected by wire or wirelessly may be used. The external microphone mounted device may be a smart speaker equipped with a microphone to which audio may be input, a wireless headphone/headset, a tablet, a smartphone, a PC, or a so-called smart home appliance such as a refrigerator, a washing machine, an air conditioner, a vacuum cleaner, or a lighting fixture, or an IoT home appliance. The position information detection sensor may be configured as a touch sensor for detecting a user operation on the image display unit 107.

The environment sensor unit 430 includes various sensors that measure information regarding an environment such as the interior in which the content reproduction device 100 is installed. For example, the environment sensor unit 430 includes a temperature sensor, a humidity sensor, an optical sensor, an illuminance sensor, an airflow sensor, an odor sensor, an electromagnetic wave sensor, a geomagnetic sensor, a global positioning system (GPS) sensor, an audio sensor (microphone and the like) that collects ambient sound and the like. Furthermore, the environment sensor unit 430 may acquire information such as a size of a room in which the content reproduction device 100 is placed, a position of the user, and brightness of the room.

The device state sensor unit 440 includes one or more sensors that acquire an internal state of the content reproduction device 100. Alternatively, circuit components of the video decoding unit 102 and the audio decoding unit 103 may have a function of externally outputting a state of an input signal, a processing status of the input signal and the like, and may serve as a sensor that detects the internal state of the device. Furthermore, the device state sensor unit 440 may detect the operation performed by the user on the content reproduction device 100 and other devices, or may store a past operation history of the user. The operation of the user may include a remote control operation on the content reproduction device 100 and other devices. The other devices herein mentioned may be a tablet, a smartphone, a PC, or a so-called smart home appliance such as a refrigerator, a washing machine, an air conditioner, a vacuum cleaner, or a lighting fixture, or an IoT home appliance. Furthermore, the device state sensor unit 440 may acquire information regarding performance and specifications of the device. The device state sensor unit 440 may be a memory such as a built-in read only memory (ROM) in which the information regarding the performance and specifications of the device is recorded, or a reader that reads the information from such memory.

The user profile sensor unit 450 detects profile information regarding the user who views the video content with the content reproduction device 100. It is not necessary that the user profile sensor unit 450 includes a sensor element. For example, a user profile such as age and sex of the user may be estimated on the basis of a face image of the user imaged by the camera 411, the utterance of the user collected by the audio sensor and the like. Furthermore, the user profile acquired on a multifunctional information terminal carried by the user such as a smartphone may be acquired by cooperation between the content reproduction device 100 and the smartphone. Note that, the user profile sensor unit does not need to detect even sensitive information related to privacy and secret information of the user. Furthermore, it is not necessary to detect the profile of the same user every time the video content is viewed, and a memory such as an electrically erasable and programmable ROM (EEPROM) that stores the user profile information acquired once may be used.

Furthermore, the multifunctional information terminal carried by the user such as the smartphone may be used as the user state sensor unit 420, the environment sensor unit 430, or the user profile sensor unit 450 by cooperation between the content reproduction device 100 and the smartphone. For example, sensor information acquired by a sensor built in a smartphone, and data managed by an application such as a health care function (pedometer and the like), a calendar or a schedule book, a memorandum, an e-mail, a browser history, and a posting and browsing history of a social network service (SNS) may be added to the state data of the user and the environment data. Furthermore, a sensor built in another CE device or IoT device present in the same space as the content reproduction device 100 may be used as the user state sensor unit 420 or the environment sensor unit 430. Furthermore, a visitor may be detected by detecting a sound of an interphone, or by communication with an interphone system. Furthermore, a luminance meter or a spectrum analysis unit that acquires the video or audio output from the content reproduction device 100 and analyzes the same may be provided as a sensor.

D. Reproduction Control of Content Based on Gazing Point

The content reproduction device 100 according to the present disclosure is configured to perform reproduction control of the content on the basis of a gazing point of the user. The reproduction control of the content is performed on one or both of image creation and sound creation. The gazing point is a value representing who is viewing which content (for example, a television program) in which manner. In this specification, in order to simplify the description, an embodiment is described in which the reproduction content is processed on the basis of the gazing point of the user.

Specifically, the content reproduction device 100 according to the present disclosure extracts an object in which the user is highly interested from the video on the basis of the gazing point of the user, tracks the object, and further performs the video signal processing such as framing and zooming based on the object gazed by the user on the video signal of the content. Furthermore, in a case where the target video is free viewpoint video, processing such as switching to a viewpoint position suitable for observing the object gazed by the user and line-of-sight change is also performed. With the framing and zooming processing, it becomes possible to provide video with which it is easy to observe the object gazed by the user, and an effect that the content further attracts the user's interest and that realistic feeling increases may be obtained.

Furthermore, in a case where the content reproduction device 100 may execute the image quality enhancement processing such as super resolution processing and dynamic range expansion as the video signal processing, such image quality processing may be performed with reference to the gazed object. For example, sharp video signal processing according to user's interest is performed; for example, the gazed object is rendered at high resolution and with high dynamic range, whereas the resolution and luminance dynamic range of other surrounding objects are suppressed.

Moreover, the content reproduction device 100 may perform processing of acquiring related information related to the object gazed by the user by automatic retrieval and displaying the same as auxiliary data. For example, in a case where the object is an athlete, related information such as a profile, results, and a related book of the athlete are retrieved. Furthermore, in a case where the object is an entertainer who appears in a movie or a drama, related information such as a movie or a television program in which the entertainer has appeared in the past or a related book are retrieved. Furthermore, when the object is a car, related information such as specifications and dealers of the car are retrieved.

Furthermore, the content reproduction device 100 performs the audio signal processing on the audio signal on the basis of the gazing point of the user in addition to the video signal. For example, in a case where framing and zooming based on the object gazed by the user is performed in the video signal processing, the sound image localization processing is performed as the audio signal processing such that a sound image of the audio signal of the voice uttered from the gazed object and the like is adapted to a display position of the object.

Furthermore, in a case where there is a plurality of objects in the frame of the video, not only the sound image of the audio signal for each object is localized at the display position of each object, but also volume adjustment according to the degree of interest of the user may be performed. For example, a volume of an audio signal emitted from a certain object in which the user is highly interested may be increased, and a volume of an audio signal emitted from an object in which the user is not much interested may be decreased. In a case where the content reproduction device 100 performs the sound quality enhancement processing such as band extension as the audio signal processing, the processing of the audio signal of each object may be performed according to the degree of interest of the user; for example, only the audio signal emitted from the object gazed by the user is subjected to the sound quality enhancement processing.

In a case where the audio signal is the object-based audio, since the individual sounding objects are supplied without being mixed, and the localization information of the sounding object is supplied as the meta information, it is possible to easily implement the audio signal processing such as the sound image localization and the sound volume adjustment for each object in accordance with the display of the object when performing the framing and zooming processing on the video.

D-1. Image Creation Based on Gazing Point (1)

Figure 5:
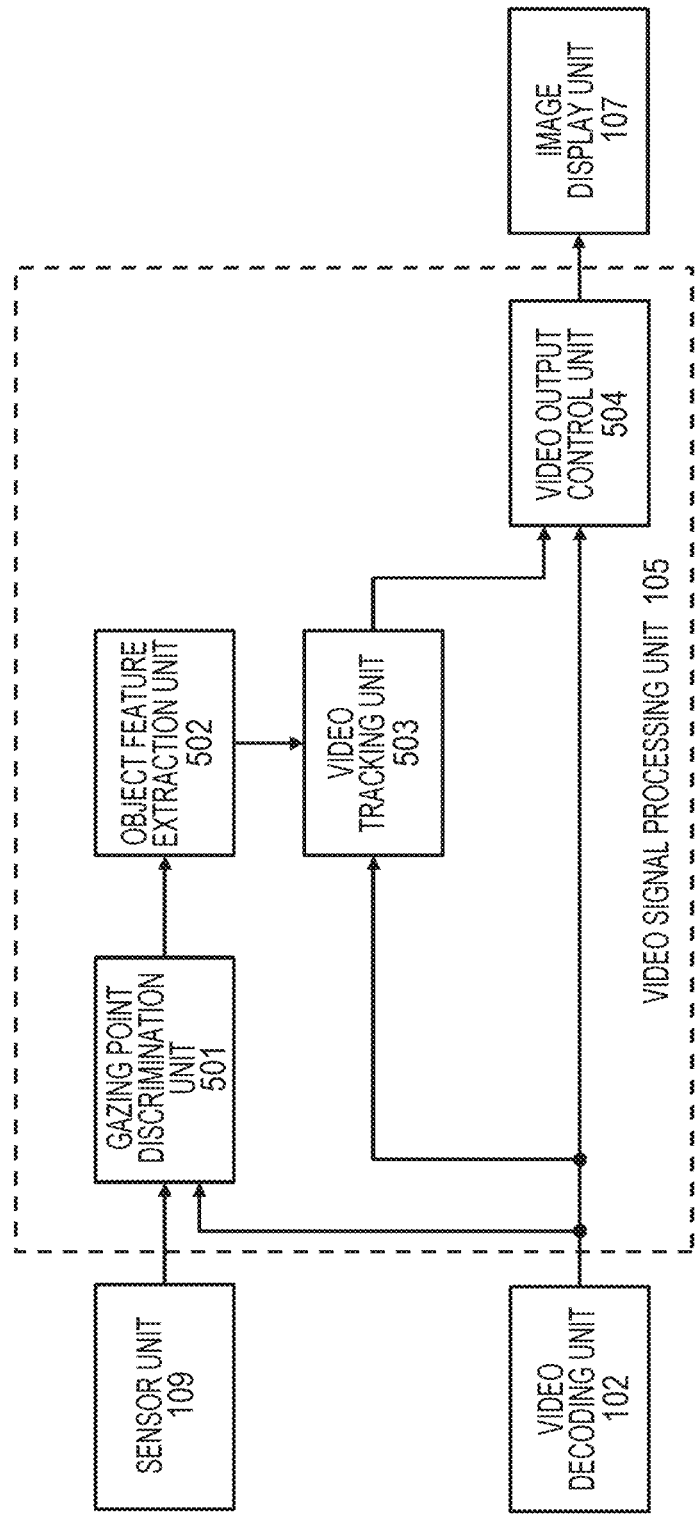
FIG. 5 is a view illustrating a functional configuration example of a video signal processing unit 105.

FIG. 5 illustrates a functional configuration example of the video signal processing unit 105 that performs image creation on the basis of the gazing point of the user. The illustrated video signal processing unit 105 is provided with a gazing point discrimination unit 501, an object feature extraction unit 502, a video tracking unit 503, and a video output control unit 504.

The gazing point discrimination unit 501 receives a decoded video stream from the video decoding unit 102, receives the sensor information from the sensor unit 109, and discriminates the gazing point gazed by the user in the video on the basis of the sensor information. The gazing point discrimination unit 501 may extract only one gazing point from the video, or may extract a plurality of gazing points simultaneously.

The gazing point discrimination unit 501 may discriminate the gazing point on the basis of motion of the line of sight of the user. For example, the gazing point discrimination unit 501 may discriminate a position where the line of sight remains for a certain period of time as the gazing point. Alternatively, the gazing point discrimination unit 501 may discriminate, as the gazing point, a position in the line-of-sight direction when a change in feelings or emotions when the degree of excitement of the user increases is detected.

The gazing point discrimination unit 501 may discriminate the gazing point by using the position of the user (relative position with respect to a display screen of the content reproduction device 100) and a direction of a face in addition to the line of sight of the user. In a case where there is a plurality of users, the gazing point discrimination unit 501 may extract a principal user and discriminate the gazing point from the line of sight of the user, or may discriminate the gazing point on the basis of an average line of sight of a plurality of users. Furthermore, the gazing point discrimination unit 501 may discriminate the gazing point in consideration of a viewing environment such as brightness of the room.

Furthermore, the gazing point discrimination unit 501 may discriminate the gazing point on the basis of an instruction by the user using a finger or a remote controller. For example, it is possible to detect the user's finger by the camera unit 410 or the user state sensor 420 (for example, the position information detection sensor), and discriminate a position on the screen indicated by the user with the finger as the gazing point. Furthermore, a position on the screen indicated by a pointer function of the remote controller may be detected and discriminated as the gazing point.

Furthermore, the gazing point discrimination unit 501 may discriminate the gazing point by using information regarding the feature of the object discriminated by the object feature extraction unit 502. For example, the information regarding the feature of the object already extracted by the object feature extraction unit 502 may be stored in a storage unit not illustrated, and the gazing point discrimination unit 501 may discriminate the gazing point using the feature information. In this case, for example, the gazing point discrimination unit 501 may determine the object gazed by the user by comparing feature information (for example, a person holding a ball) included in the user utterance acquired by the sensor unit 109 with the feature information of the object extracted by the object feature extraction unit 502. Furthermore, in a case where the meta information transmitted together with the video stream includes the information regarding the object, the gazing point discrimination unit 501 may discriminate the gazing point by using the meta information. Note that, the meta information may be included in the video stream to be transmitted, or may be acquired from an external server or a recording medium through a path different from that of the video stream.

Furthermore, the gazing point discrimination unit 501 may discriminate the gazing point of the user (or a position at which the user should gaze) on the basis of a context such as story development of the content in addition to the sensor information. For example, in a case of video of sport game watching, a player to be focused on according to the progress of the game may be discriminated as the gazing point. In a case of a video stream of baseball relay broadcasting, it is estimated that the gazing point should be moved from a pitcher who pitches a ball to a batter who hits the ball and further in a direction of the hit ball from moment to moment. In a case of a video stream of football or rugby relay broadcasting, it is estimated that a player keeping a ball or a player to whom the ball is passed should be gazed. Furthermore, in a case of a video stream of a movie or a drama, it is estimated that a main character or a performer who is currently speaking should be gazed. Note that, the gazing point is not limited to a person, and may be an object (a signboard (including digital signage) arranged in a stadium, a car, studio set furniture, furnishings and the like) appearing in the video.

The gazing point discrimination unit 501 may perform gazing point discrimination processing using a machine learning model of which deep learning is performed so as to estimate the gazing point of the user from the sensor information and the video stream.

The object feature extraction unit 502 extracts the feature of the object corresponding to the gazing point discriminated by the gazing point discrimination unit 501. For example, in a case of the video of sport game watching, the feature of the player discriminated as the gazing point is extracted, and in a case of the video of the movie or drama, the feature of the performer discriminated as the gazing point is extracted. Note that, the object discriminated as the gazing point is not limited to a person, and may be an object (a signboard (including digital signage) arranged in a stadium, a car, studio set furniture, furnishings and the like) appearing in the video. The object feature extraction unit 502 may perform feature extraction processing of the object by using the machine learning model of which deep learning is performed so as to estimate the feature of the object corresponding to the gazing point from the gazing point and the video stream.

The video tracking unit 503 tracks the object at the gazing point in the video stream on the basis of the feature of the object at the gazing point extracted by the object feature extraction unit 502, and outputs coordinates of the object at the gazing point in the video frame. The video tracking unit 503 may output the coordinates of the object for each frame, or may output the coordinates of the object at predetermined frame intervals. Furthermore, in a case where there is a plurality of gazing points, the video tracking unit 503 may track the object at each gazing point and output the coordinates of each object.

The video output control unit 504 performs output control of the video stream on the basis of the coordinates of the object output from the video tracking unit 503. Specifically, the video output control unit 504 performs the framing and zooming processing based on the coordinates of the object gazed by the user. For example, the video output control unit 504 performs the framing processing such that the coordinates of the object gazed by the user are at the center of the frame, and further zooms in to the object gazed by the user. Furthermore, in a case where there is a plurality of gazing points, the video output control unit 504 may perform the framing and zoom processing so that all objects (or more objects) gazed by the user are displayed. Furthermore, in a case where the target video stream is a free viewpoint video, the video output control unit 504 performs the framing and zooming processing including viewpoint change and line-of-sight change. Note that, the framing and zooming processing (or rendering processing) is basically performed on the basis of the line of sight of a specific user, but different framing and zooming processing may be performed according to the number of users who view simultaneously, or the framing and zooming processing may be switched according to the environment of the room.

Furthermore, in a case where the video output control unit 504 performs the image quality enhancement processing such as super resolution processing or dynamic range expansion, this may perform the image quality enhancement processing based on the coordinates of the object gazed by the user. For example, the video output control unit 504 performs sharp video signal processing according to user's interest; for example, the gazed object is rendered at high resolution and with high dynamic range, whereas the resolution and luminance dynamic range of other surrounding objects are suppressed. While the vicinity of the coordinates of the object gazed by the user are converted at high resolution and with high dynamic range, in an area separated from the object gazed by the user, the video with suppressed resolution and dynamic range is obtained, so that the video that emphasizes or enhances the object gazed by the user is obtained.

The video output control unit 504 may perform framing, zooming, and other video signal processing on the video stream by using a machine learning model of which deep learning is performed so as to perform optimum framing, zooming, and other video signal processing on the object at the gazing point and the objects around the gazing point.

Various types of display devices such as a liquid crystal display, an organic EL display, a self-luminous display, a 3D display, and a holographic display are assumed as the image display unit 107. Therefore, the video output control unit 504 performs adjustment processing according to the type of the display on the video stream subjected to framing, zooming, and other image quality processing based on the gazed object. Then, the video processed by the video output control unit 504 is output by the image display unit 107.

Although not illustrated in FIG. 5, in a case where the framing and zooming processing based on the object gazed by the user is performed in the video signal processing unit 105, a position, a size, and a direction in which each object is displayed in the video frame change from those in an original video frame. The objects displayed in the video also include the sounding object that emits the audio signal. Therefore, in a case where the framing and zooming processing is performed on the video stream, it is preferable to perform processing of generating the sound image so that the audio signal of each sounding object is heard from the display position (sounding coordinates) in the video frame after the framing and zooming processing, that is, image sound matching processing.

Figure 17:
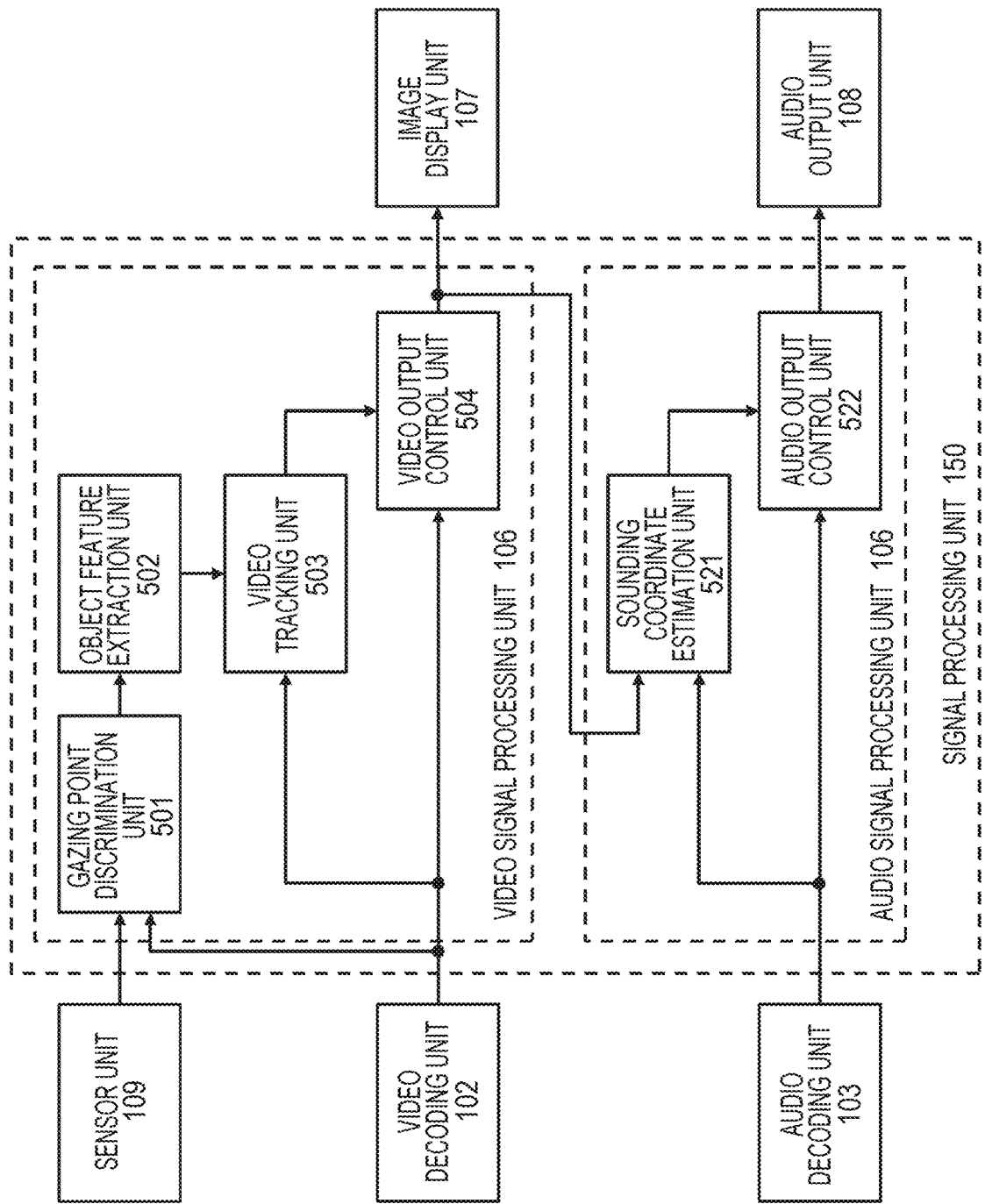
FIG. 17 is a view illustrating a functional configuration example of the signal processing unit 150 that performs the image sound matching processing.

FIG. 17 illustrates a functional configuration example of the signal processing unit 150 configured to perform the image creation including the framing and zooming processing on the basis of the gazing point of the user and to perform the image sound matching processing. Note that, functional modules having the same names and similar functions as those illustrated in FIG. 5 are denoted by the same reference numerals, and detailed description thereof is herein omitted or the description is minimized.

A sounding coordinate estimation unit 521 receives the video stream after being subjected to the framing and zooming processing from the video output control unit 102, and receives a decoded audio stream from the audio decoding unit 103. Then, the sounding coordinate estimation unit 521 estimates the display position of the sounding object serving as the sound source in the video after being subjected to the framing and zooming processing, and outputs the same as the sounding coordinates. The sounding object is the object and the like discriminated as the gazing point by the gazing point discrimination unit 501. In a case where the audio signals of a plurality of objects are superimposed on the audio stream, the sounding coordinate estimation unit 521 separates the waveform of the audio signal for each object from an original audio stream, and estimates the sounding coordinates for each separated object. Note that, in a case where the audio stream follows the object-based audio, since the individual sounding objects are not mixed, the sounding coordinate estimation unit 521 does not need to perform separation processing of the audio signal for each object, and may easily calculate the display position, size, and direction of each object after the framing and zooming processing on the basis of the localization information included in the meta information.

In a case where the image output unit 107 uses the 2D display, the sounding coordinate estimation unit 521 estimates two-dimensional sounding coordinates. Furthermore, in a case where the image output unit 107 is the 3D display having depth information such as the holographic display and a light-field display, the sounding coordinate estimation unit 521 estimates three-dimensional sounding coordinates. Furthermore, in a case where a plurality of sounding objects is estimated, the sounding coordinate estimation unit 521 may estimate the volume (or a volume ratio between the sounding objects) for each sounding object.

Here, in a case where the image output unit 107 is the 3D display, for example, the sounding coordinate estimation unit 521 may estimate a 3D depth (projecting amount), a size, and a direction of 3D display of the sounding object in the 3D video, and estimate the three-dimensional sounding coordinates, the volume of the output sound, and the direction of the output sound so as to correspond to the 3D depth, the size, and the direction of the 3D display. Specifically, for example, the sound image of the 3D sounding object 3D-displayed from a certain position on the image output unit 107 toward the user who views the content in front of the image output unit 107 may be generated so as to be heard by the user from the display position on the image output unit 107. Furthermore, in a case where the 3D sounding object is displayed at a position closer to the user (in a case where the projecting amount is large), the sound image may be generated so as to be heard louder by the user.

The sounding coordinate estimation unit 521 performs estimation processing of the sounding coordinates of each sounding object by using a machine learning model of which deep learning is performed so as to estimate the sounding coordinates of the object that is the sound source in the video from the input video stream and audio stream. Note that, there also is a method of detecting the sound source appearing in the video by video analysis and audio analysis of the input video stream and audio stream, and calculating the display position of the sound source on the screen, but it is difficult to perform calculation processing in real time. Therefore, as described above, in this embodiment, the sounding coordinate estimation unit 521 uses the machine learning model.

The audio output control unit 522 controls drive of the audio output unit 108 for generating the sound image of each sounding object in the video according to the sounding coordinates estimated by the sounding coordinate estimation unit 521. Specifically, for example, in a case where the audio output unit 108 includes a plurality of speakers, the audio output control unit 522 determines the direction and the volume of the sound at the sounding position for each sounding object for which the sounding coordinates are estimated, determines a combination of the speakers for generating the sound image, and sets the volume and the direction of the sound to be output from each speaker.

Furthermore, the audio output control unit 522 may perform the audio signal processing weighted on the basis of a gazing degree of the user; for example, sound quality enhancement processing such as band extension is applied or a special effect is applied to the audio signal emitted from the sounding object gazed by the user.

Here, a specific example of the framing and zooming processing of the video based on the gazing point of the user is described.

Figure 18:
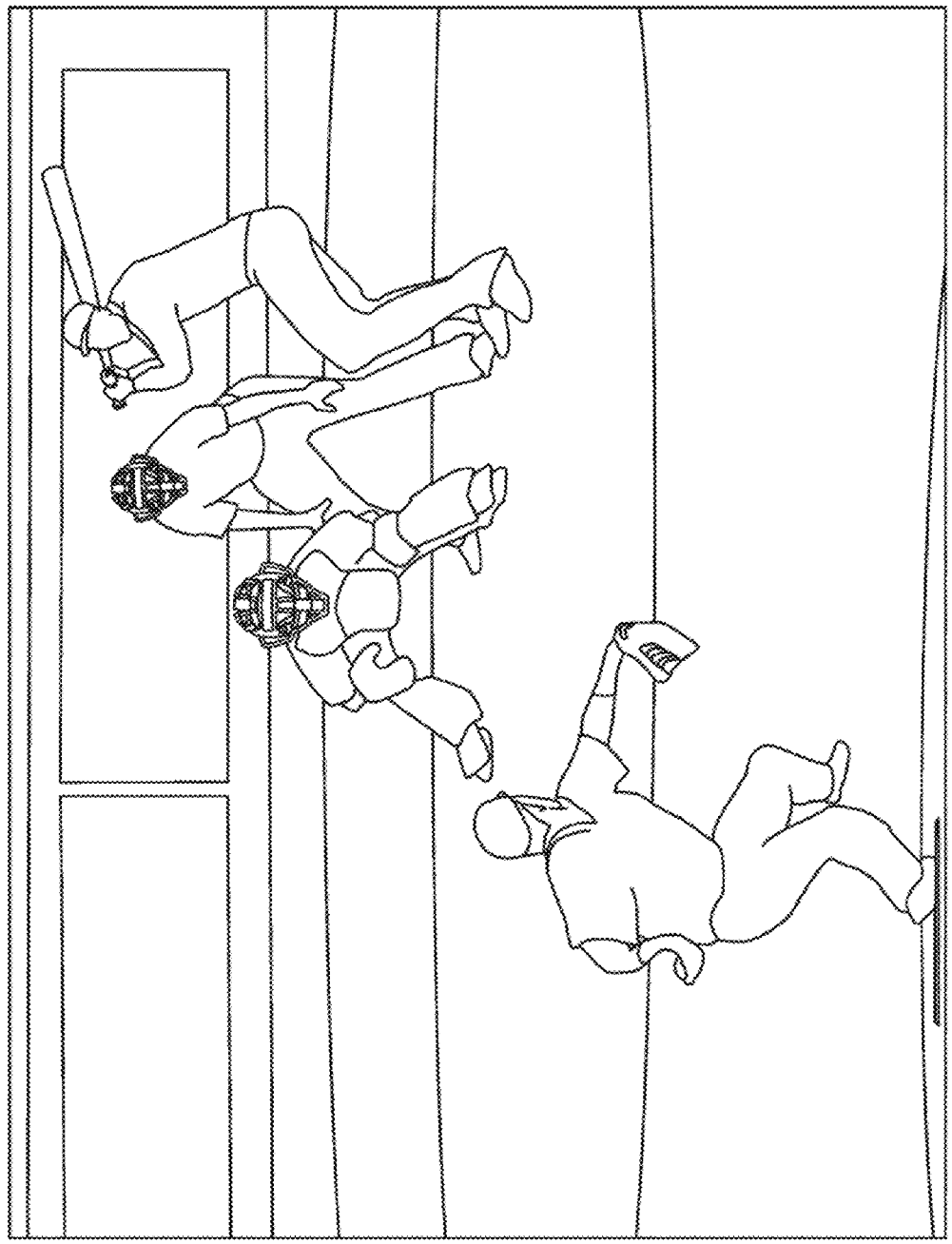
FIG. 18 is a view illustrating an example of performing framing and zooming processing on video on the basis of a gazing point of a user.
Figure 19:
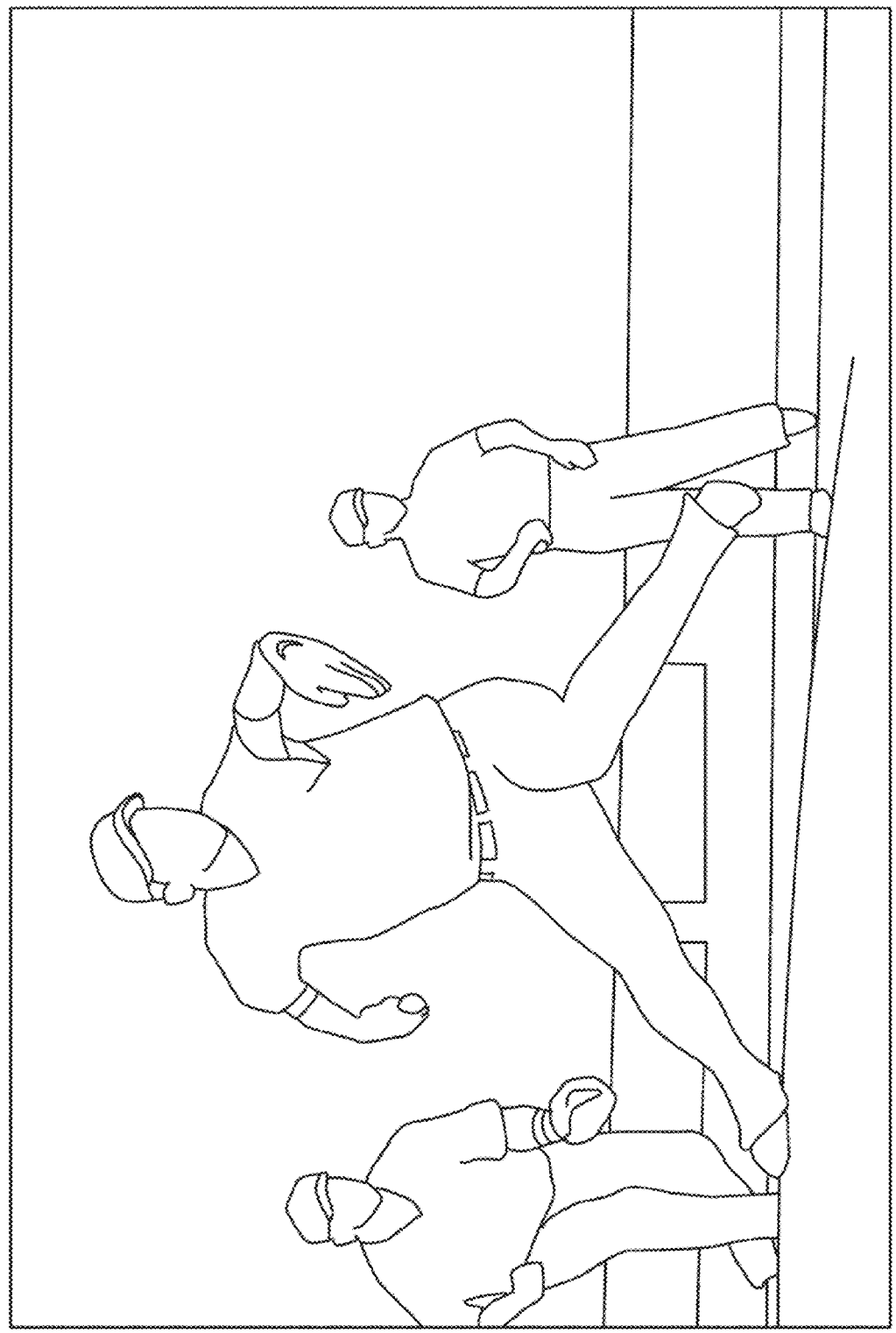
FIG. 19 is a view illustrating an example of performing framing and zooming processing on video on the basis of a gazing point of a user.
Figure 20:
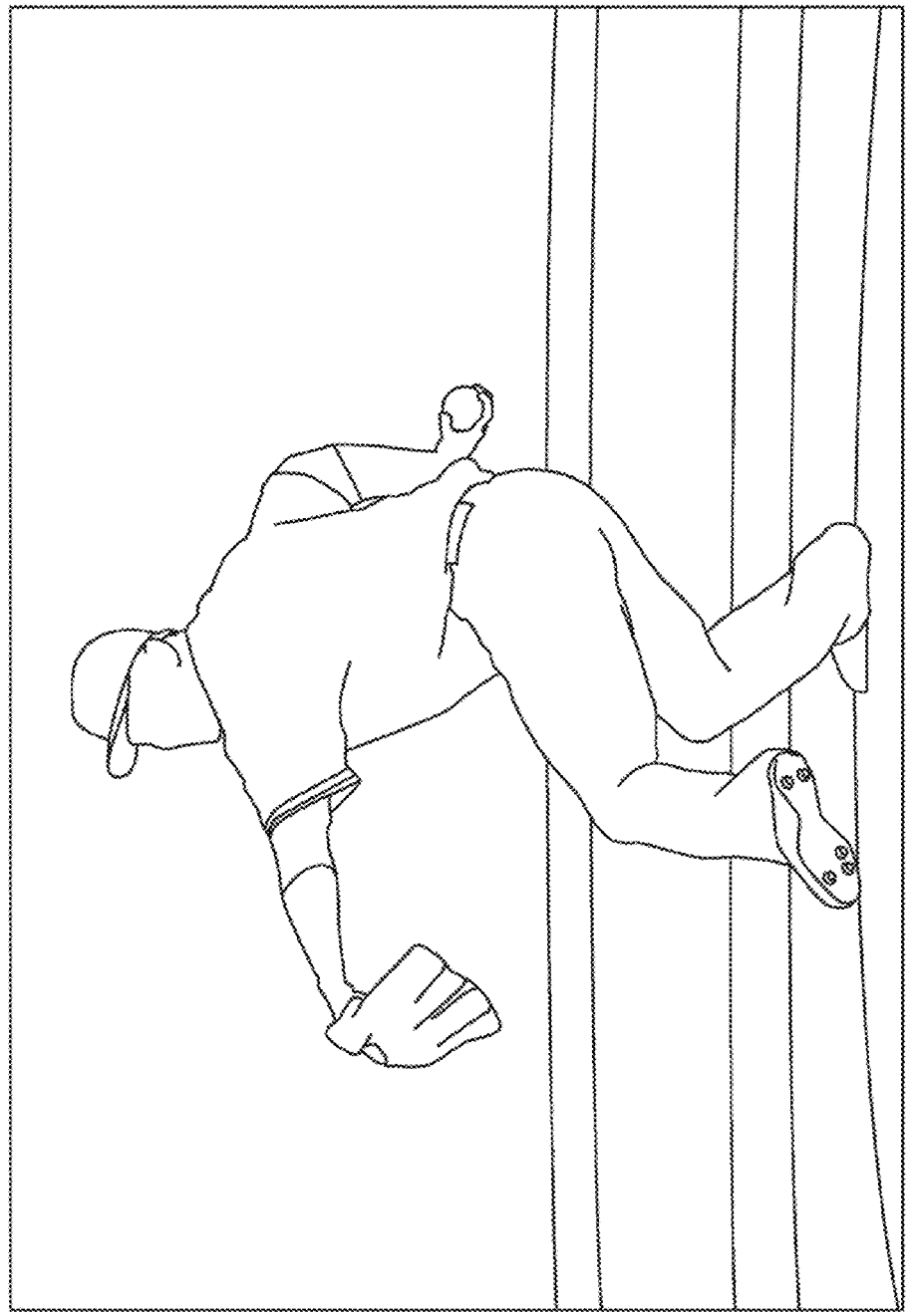
FIG. 20 is a view illustrating an example of performing framing and zooming processing on video on the basis of a gazing point of a user.

For example, in a case of a video stream of baseball relay broadcasting, the gazing point of the user moves from a pitcher who pitches a ball to a batter who hits the ball and further in a direction of the hit ball from moment to moment. FIG. 18 illustrates an imaged video of a camera installed on a backscreen. Here, when the gazing point discrimination unit 501 discriminates that the user wants to gaze from a third base side or from the side of the pitcher, the video output control unit 504 performs the framing and zooming processing so as to obtain video in which the pitcher is viewed from the third base side as illustrated in FIG. 19. Furthermore, when the gazing point discrimination unit 501 discriminates that the user wants to gaze a home base side or the pitcher from the front, the video output control unit 504 performs the framing and zooming processing so as to obtain video in which the pitcher is viewed from the home base side as illustrated in FIG. 20.

Figure 21:
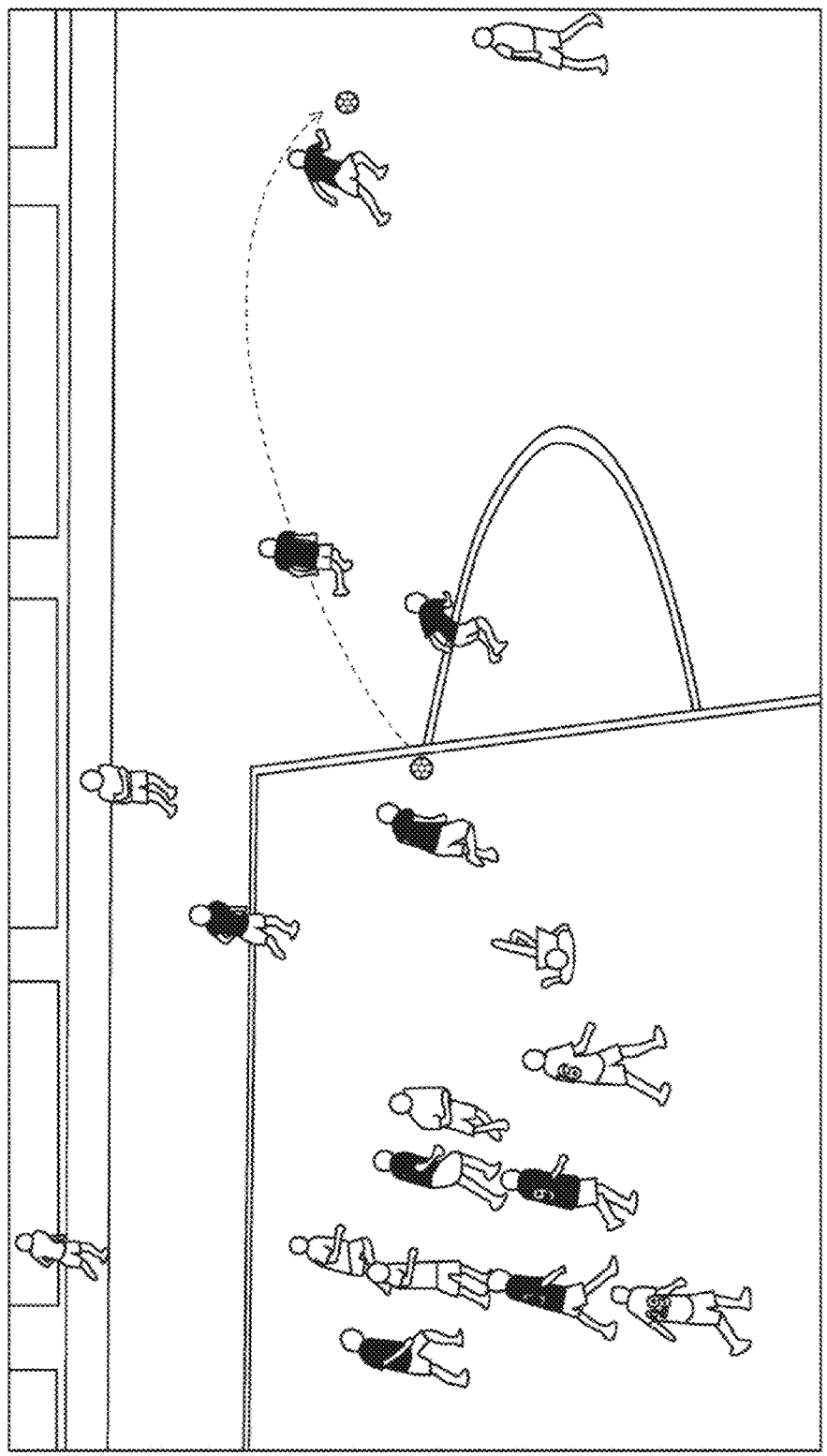
FIG. 21 is a view illustrating an example of performing framing and zooming processing on video on the basis of a gazing point of a user.
Figure 22:
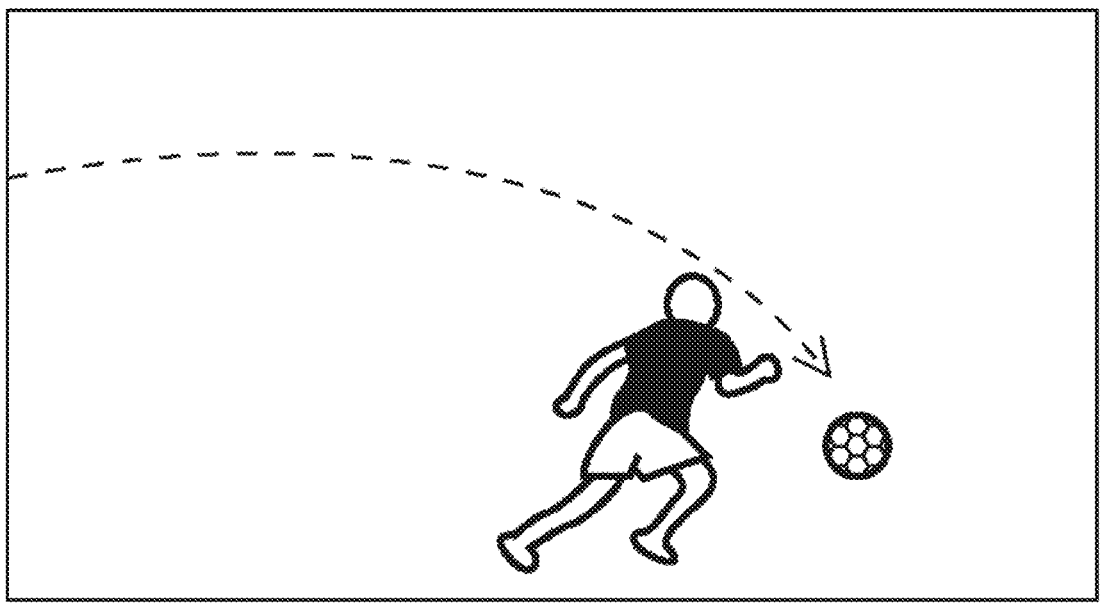
FIG. 22 is a view illustrating an example of performing framing and zooming processing on video on the basis of a gazing point of a user.

Furthermore, in a case of a video stream of football or rugby relay broadcasting, it is assumed that the user gazes at a player keeping a ball or a player to whom the ball is passed. Furthermore, in a case of a video stream of a movie or a drama, it is assumed that a main character or a performer who is currently speaking is gazed. FIG. 21 illustrates video in which a long pass is made from a penalty area of one's own side toward an enemy side. In such a case, when the gazing point discrimination unit 501 discriminates that the user is gazing at the ball kicked to the enemy side, the video output control unit 504 performs the framing and zooming processing so as to focus on the ball and the player following the ball as illustrated in FIG. 22.

Furthermore, it is not required that the zooming and framing processing is performed instantaneously, and this may be performed stepwise up to a target framing image or a target zooming image. For example, when the zooming and framing processing is performed at a high speed, there is a possibility that the user may get motion sickness or the user cannot properly follow the target object. Therefore, such a problem may be reduced by performing display control so as to approach target viewpoint video at a predetermined speed or performing display control so as to approach the target viewpoint video stepwise. Furthermore, when such display control is performed, by performing the image sound matching processing, the sound image and the volume are also generated so as to change at a predetermined speed or change stepwise, so that stereoscopic voice output control may be implemented.

Subsequently, the machine learning model used in the image creation based on the gazing point is described.

Figure 6:
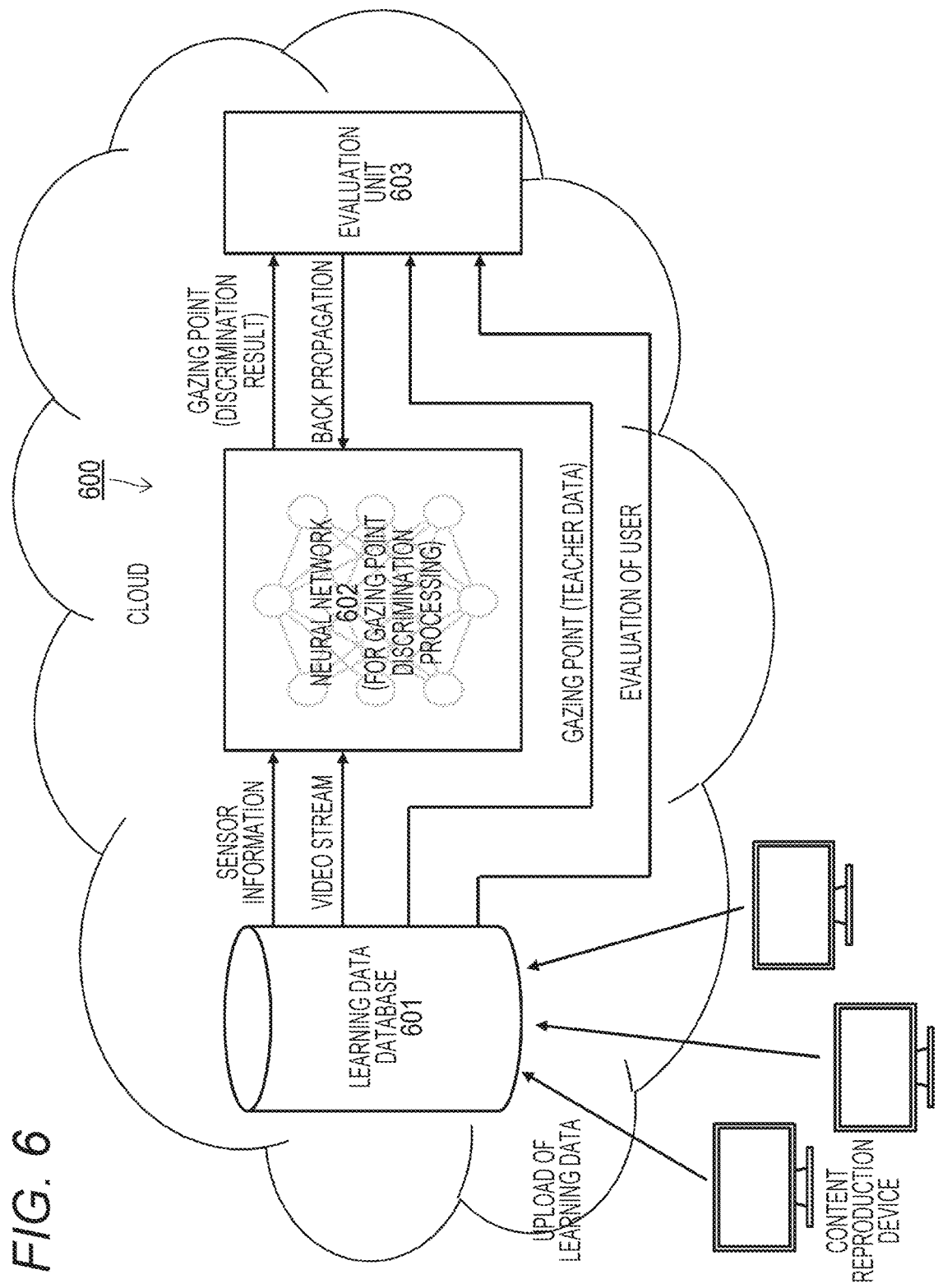
FIG. 6 is a view illustrating a functional configuration example of an artificial intelligence server 600 that performs deep learning on a neural network for gazing point discrimination processing.

The machine learning model used in the gazing point discrimination processing by the gazing point discrimination unit 501 is represented by, for example, the neural network. Learning of the machine learning model represented by the neural network is performed through processing of changing the neural network by inputting learning data to the neural network to perform learning of a connection weight coefficient between nodes (neurons). The learning of the neural network may be performed in the content reproduction device 100, but it is also possible to perform deep learning using enormous learning data on the cloud. FIG. 6 schematically illustrates a functional configuration example of an artificial intelligence server 600 that performs deep learning on the neural network used by the gazing point discrimination unit 501. As an example, the artificial intelligence server 600 is constructed on the cloud, but may be constructed with edge computing such as an edge or a mobile edge.

In a learning data database 601, enormous learning data uploaded from a large number of content reproduction devices 100 (for example, television reception devices of respective homes) are accumulated. The learning data includes the sensor information input to the neural network as the gazing point discrimination unit 501 in the content reproduction device 100, the video stream, the gazing point discriminated at that time (output from the gazing point discrimination unit 501), and an evaluation value for a discrimination result. The evaluation value may be, for example, a simple evaluation (whether it is OK or NG) of the user for the discriminated gazing point (or video output on the basis of the discrimination result).

A neural network 602 for discriminating the gazing point receives a combination of the sensor information and the video stream read from the learning data database 601 as the learning data, and outputs a result of discriminating the gazing point of the user at that time.

An evaluation unit 603 evaluates a learning result of the neural network 602. Specifically, the evaluation unit 603 receives the discrimination result of the gazing point output from the neural network 602, the discrimination result of the gazing point (teacher data) and the evaluation of the user combined with the input to the neural network 602 read from the learning data database 601, and defines a loss function based on a difference between the output from the neural network 602 and the teacher data. Note that, it is possible to calculate the loss function by weighting so as to increase the weight of the difference from the teacher data having a high evaluation result of the user and decrease the weight of the difference from the teacher data having a low evaluation result of the user. Then, the evaluation unit 603 performs learning of the neural network 602 by back propagation so as to minimize the loss function.

Figure 7:
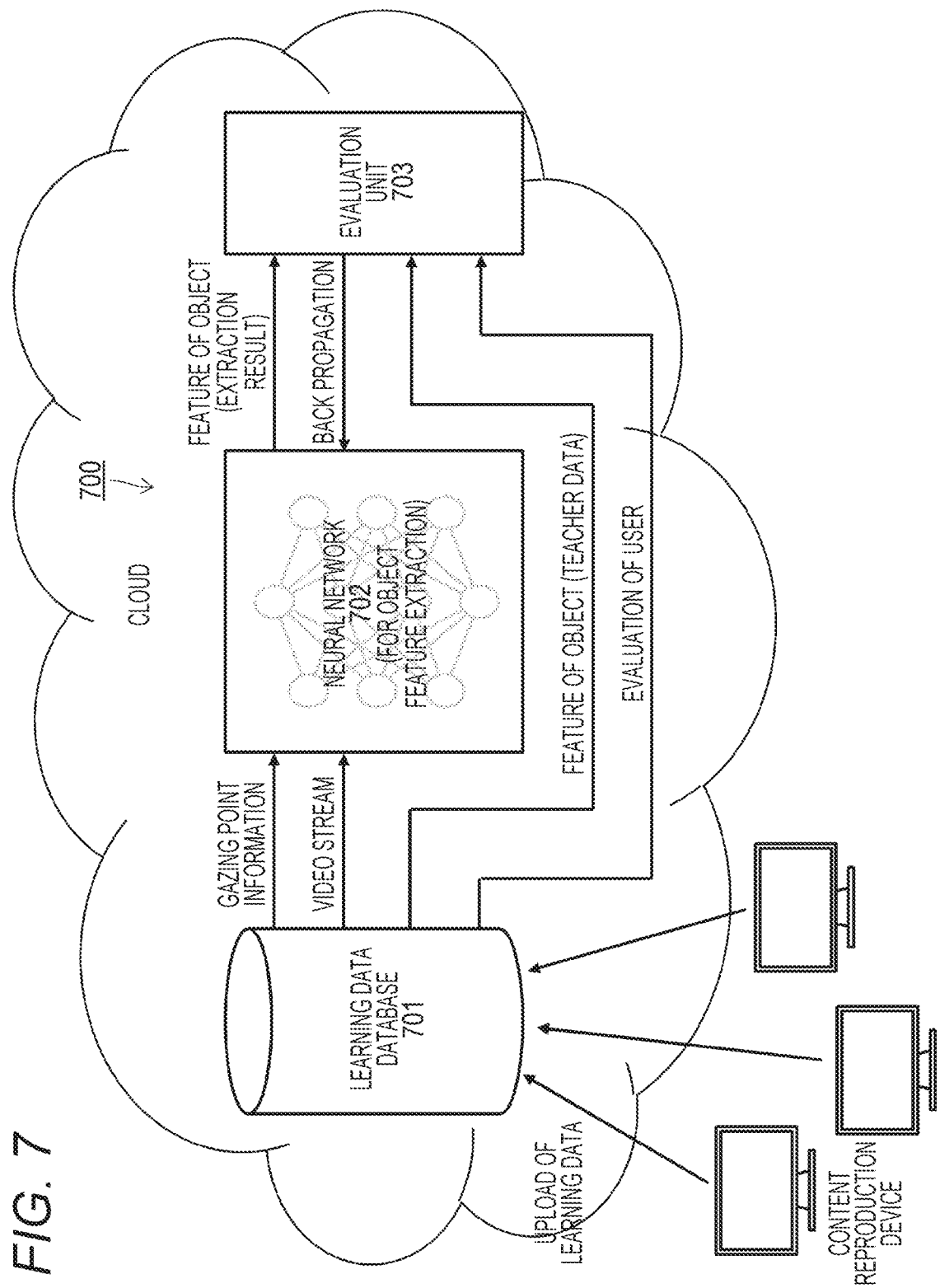
FIG. 7 is a view illustrating a functional configuration example of an artificial intelligence server 700 that performs deep learning on a neural network for object feature extraction processing.

Furthermore, the machine learning model used for the feature extraction processing of the object by the object feature extraction unit 502 is represented by the neural network. FIG. 7 schematically illustrates a functional configuration example of an artificial intelligence server 700 that performs deep learning on the neural network used by the object feature extraction unit 502. As an example, the artificial intelligence server 700 is constructed on the cloud, but this may be constructed with edge computing such as an edge or a mobile edge.

In a learning data database 701, enormous learning data uploaded from a large number of content reproduction devices 100 (for example, television reception devices of respective homes) are accumulated. The learning data includes information of the gazing point discriminated by the gazing point discrimination unit 501 in the content reproduction device 100, the video stream, the feature of the object discriminated at that time (output from the object feature extraction unit 502), and an evaluation value for an extraction result. The evaluation value may be, for example, a simple evaluation (whether it is OK or NG) of the user for the extracted feature of the object (or video output on the basis of the extraction result).

The neural network 702 for extracting the object feature receives a combination of the information of the gazing point and the video stream read from the learning data database 701 as the learning data, and extracts the object corresponding to the gazing point.

An evaluation unit 703 evaluates a learning result of the neural network 702. Specifically, the evaluation unit 703 receives the feature of the object output from the neural network 702, the feature of the object (teacher data) and the user evaluation combined with the input to the neural network 702 read from the learning data database 701, and defines a loss function based on a difference between the output from the neural network 702 and the teacher data. Note that, it is possible to define the loss function by weighting so as to increase the weight of the difference from the teacher data having a high evaluation result of the user and decrease the weight of the difference from the teacher data having a low evaluation result of the user. Then, the evaluation unit 703 performs learning of the neural network 702 by back propagation so as to minimize the loss function.

Figure 8:
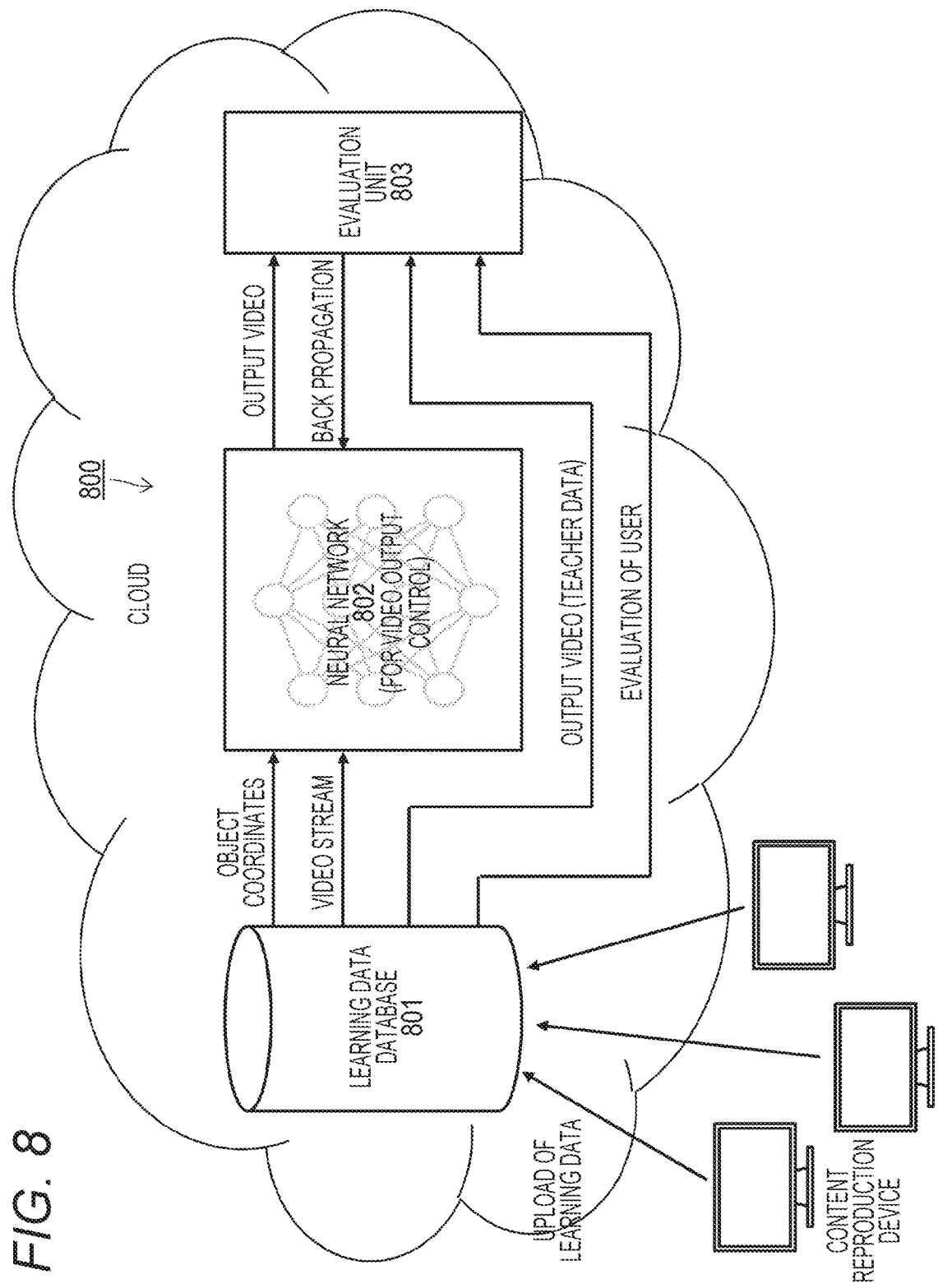
FIG. 8 is a view illustrating a functional configuration example of an artificial intelligence server 800 that performs deep learning on a neural network for video output control.

Furthermore, the machine learning model used in video output processing by the video output control unit 504 is also represented by the neural network. FIG. 8 schematically illustrates a functional configuration example of an artificial intelligence server 800 that performs deep learning on the neural network used by the video output control unit 504. As an example, the artificial intelligence server 800 is constructed on the cloud, but this may be constructed with edge computing such as an edge or a mobile edge.

In a learning data database 801, enormous learning data uploaded from a large number of content reproduction devices 100 (for example, television reception devices of respective homes) are accumulated. The learning data includes the coordinates of the object tracked by the video tracking unit 503 in the content reproduction device 100, the video stream, video output from the video output control unit 504 at that time, and an evaluation value for the output video. The evaluation value may be, for example, a simple evaluation (OK or NG) of the user for the output video.

A neural network 802 for video output control receives a combination of the coordinates of the object and the video stream read from the learning data database 801 as the learning data, and performs the video output control on the video stream. The video output control herein mentioned includes framing, zooming, resolution conversion, and luminance dynamic range conversion for the object at the gazing point and objects around the gazing point.

An evaluation unit 803 evaluates a learning result of the neural network 802. Specifically, the evaluation unit 803 receives the video output from the neural network 802, the video stream (teacher data) and the evaluation of the user combined with the coordinates of the object read from the learning data database 801, and defines a loss function based on the difference from the video stream output from the neural network 802. Note that, it is possible to define the loss function by weighting so as to increase the weight of the difference from the teacher data having a high evaluation result of the user and increase the weight of the difference from the teacher data having a low evaluation result of the user. Then, the evaluation unit 803 performs learning of the neural network 802 by back propagation so as to minimize the loss function.

Figure 15:
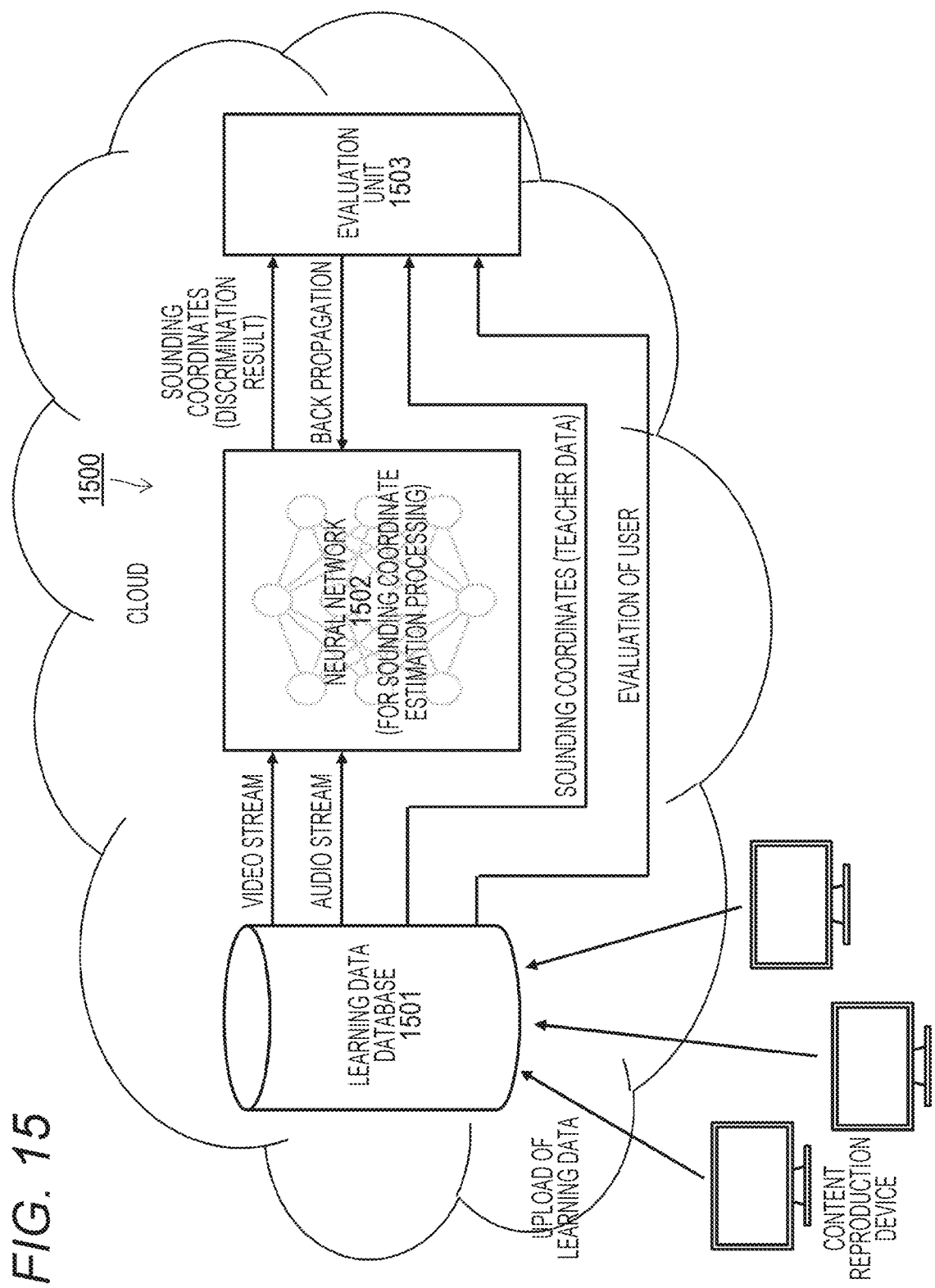
FIG. 15 is a view illustrating a functional configuration example of an artificial intelligence server 1500 that performs deep learning on a neural network for sounding coordinate estimation processing.

Furthermore, the machine learning model used in sounding coordinate estimation processing by the sounding coordinate estimation unit 521 is represented by the neural network. FIG. 15 schematically illustrates a functional configuration example of an artificial intelligence server 1500 that performs deep learning on the neural network used by the sounding coordinate estimation unit 521. As an example, the artificial intelligence server 1500 is constructed on the cloud, but this may be constructed with edge computing such as an edge or a mobile edge.

In a learning data database 1501, enormous learning data uploaded from a large number of content reproduction devices 100 (for example, television reception devices of respective homes) are accumulated. The learning data includes the video stream decoded by the video decoding unit 102 in the content reproduction device 100 (or after the framing and zooming processing), the video stream decoded by the audio decoding unit 103, sounding coordinates estimated by a sounding coordinate estimation unit 1401 at that time, and an evaluation value for the sounding coordinates. The evaluation value may be, for example, a simple evaluation (OK or NG) of the user for the audio output (or the generated sound image) based on the estimated sounding coordinates.

A neural network 1502 for the sounding coordinate estimation processing receives a combination of the video stream and the audio stream read from the learning data database 1501 as the learning data, estimates the display position of the object serving as the sound source in the video, and outputs the same as the sounding coordinates. In a case where audio signals of a plurality of objects are superimposed on the audio stream, the neural network 1502 separates a waveform of the audio signal for each object from an original audio stream, and estimates the sounding coordinates for each separated object.

The evaluation unit 1503 evaluates a learning result of the neural network 1502. Specifically, the evaluation unit 1503 receives the sounding coordinates output from the neural network 1502, the sounding coordinates (teacher data) and the user evaluation combined with the video stream and the audio stream read from the learning data database 1501, and defines a loss function based on a difference from the video stream output from the neural network 1502. Note that, it is possible to define the loss function by weighting so as to increase the weight of the difference from the teacher data having a high evaluation result of the user and increase the weight of the difference from the teacher data having a low evaluation result of the user. Then, the evaluation unit 1503 performs learning of the neural network 1502 by back propagation so as to minimize the loss function.

Figure 9:
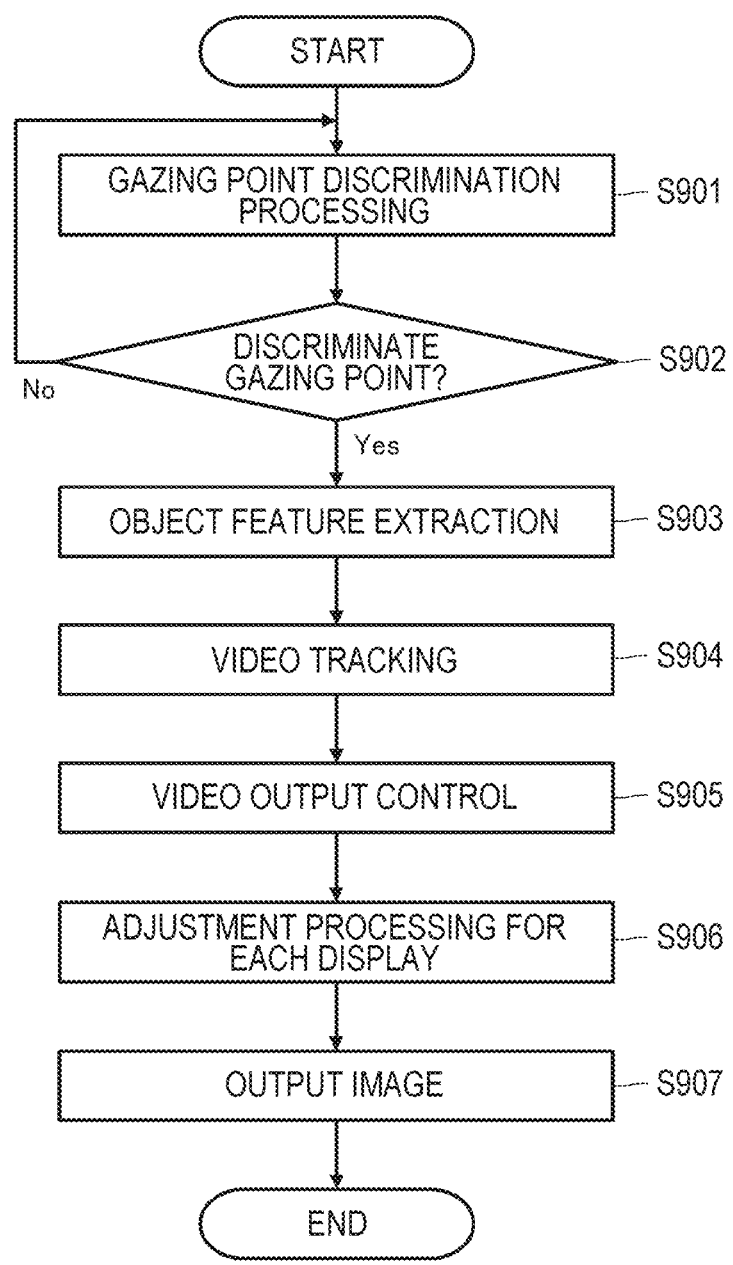
FIG. 9 is a flowchart illustrating a procedure of video signal processing performed in the video signal processing unit 105 illustrated in FIG. 5.

FIG. 9 illustrates a procedure of the video signal processing performed in the video signal processing unit 105 illustrated in FIG. 5 as a flowchart.

First, the gazing point discrimination unit 501 receives the decoded video stream from the video decoding unit 102, receives the sensor information from the sensor unit 109, and discriminates the gazing point gazed by the user in the video on the basis of the sensor information (step S901).

The gazing point discrimination unit 501 basically discriminates a position in which the user is interested and gazing from the video frame on the basis of motion of the line of sight of the user and the like. Note that, the gazing point discrimination unit 501 may discriminate not the position gazed by the user but the position at which the user should gaze on the basis of a context of the content being reproduced and the like.

In a case where the gazing point discrimination unit 501 may discriminate the gazing point of the user (Yes at step S902), the object feature extraction unit 502 extracts the feature of the object corresponding to the gazing point discriminated by the gazing point discrimination unit 501 (step S903).

Next, the video tracking unit 503 tracks the object at the gazing point in the video stream on the basis of the feature of the object at the gazing point extracted by the object feature extraction unit 502, and outputs the coordinates of the object at the gazing point in the video frame (step S904).

Next, the video output control unit 504 performs the output control of the video stream on the basis of the coordinates of the object output from the video tracking unit 503 (step S905). The video output control herein mentioned includes framing, zooming, resolution conversion, and luminance dynamic range conversion for the object at the gazing point and objects around the gazing point.

Various types of display devices such as a liquid crystal display, an organic EL display, a self-luminous display, a 3D display, and a holographic display are assumed as the image display unit 107. Therefore, the video output control unit 504 performs adjustment processing according to the type of the display on the video stream subjected to the framing, zooming, and other image quality processing based on the gazed object (step S906).

Then, the video processed by the video output control unit 504 is output by the image display unit 107 (step S907).

Figure 16:
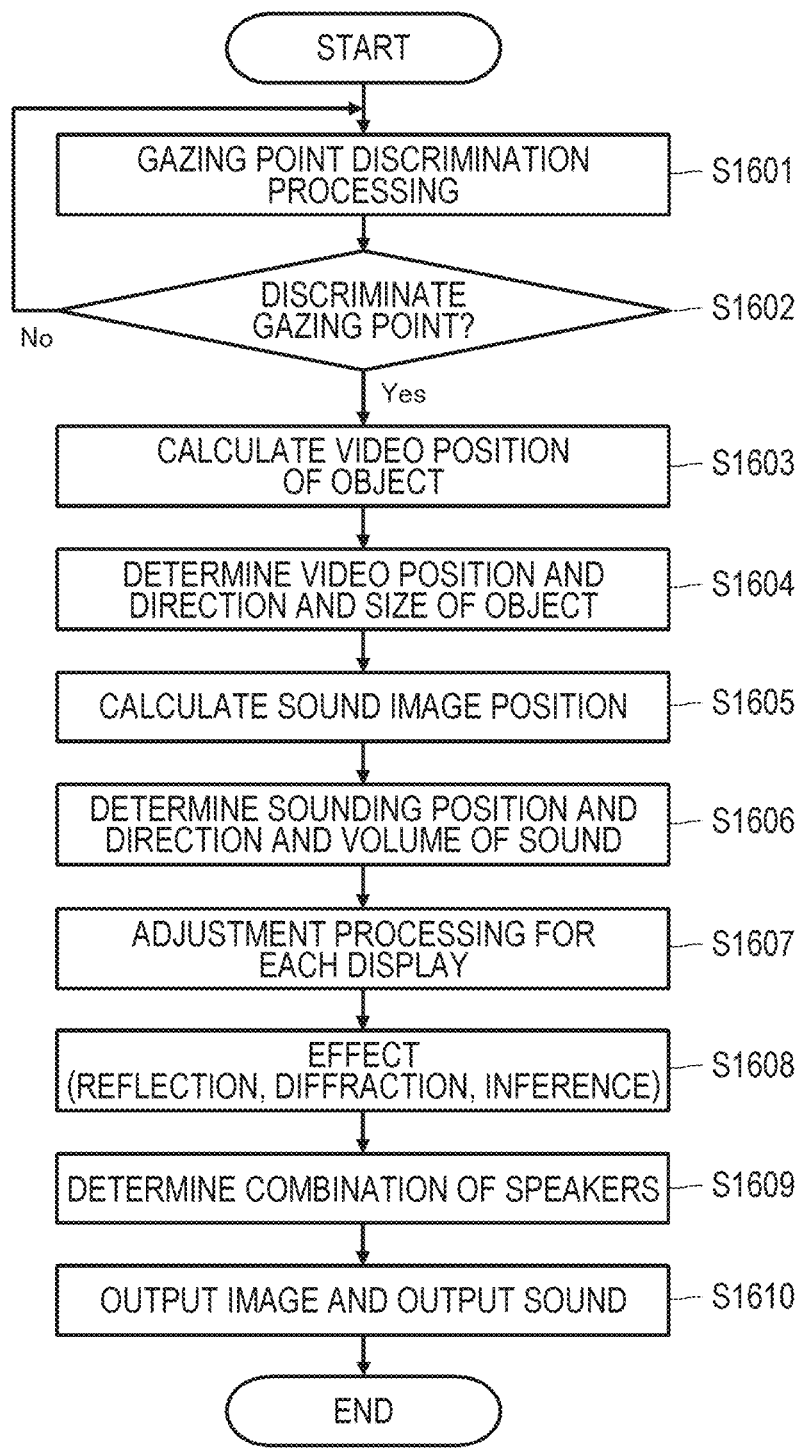
FIG. 16 is a flowchart illustrating a procedure of the image sound matching processing executed in the signal processing unit 150.

FIG. 16 illustrates a procedure of the image sound matching processing executed by the signal processing unit 150 illustrated in FIG. 17 as a flowchart. Note that the video signal processing such as the framing and zooming based on the gazing point of the user is implemented according to the procedure illustrated in FIG. 5, so that, in FIG. 16, the description of the video signal processing is omitted or minimized.

First, the gazing point discrimination unit 501 receives the decoded video stream from the video decoding unit 102, receives the sensor information from the sensor unit 109, and discriminates the gazing point gazed by the user in the video on the basis of the sensor information (step S1601).

In a case where the gazing point discrimination unit 501 may discriminate the gazing point of the user (Yes at step S1602), the video output control unit 504 performs the framing and zooming processing on the video stream on the basis of the result of tracking the object corresponding to the gazing point. Then, the sounding coordinate estimation unit 521 calculates the video position of each sounding object from the video after being subjected to the framing and zooming processing (step S1603), and determines the video position of each sounding object, and the direction and size of the object (step S1604).

Next, the sounding coordinate estimation unit 521 calculates the position of the sound image for each sounding object on the basis of the video position of the object, and the direction and size of the object determined at preceding step S1604 (step S1605), determines the sounding position of the sound image, and the direction and volume of the sound (step S1606), and outputs the same as information of the sounding coordinates. In a case where the audio signal is the object-based audio, the individual sounding objects are supplied without being mixed, and the localization information of the sounding object is supplied as the meta information, so that it is possible to easily implement the calculation of the sound image position for each sounding object and the processing of determining the sounding position, and the direction and volume of the sound.

The video output control unit 504 performs output control of the video stream on the basis of the coordinates of the object output from the video tracking unit 503. The video output control herein mentioned includes framing, zooming, resolution conversion, and luminance dynamic range conversion for the object at the gazing point and objects around the gazing point. Then, the video output control unit 504 performs adjustment processing according to the type of the display (step S1607).

Furthermore, the audio output control unit 522 applies an effect (reflection, diffraction, interference and the like) to the sound image of each sounding object on the basis of the video position of each sounding object, and the direction and size of the object determined at step S1606 (step S1608). Next, the audio output control unit 522 determines a combination of speakers for generating the sound image on the basis of the direction of the sound and the volume of the sound at the sounding position and the effect determined at preceding steps S1606 and S1608 (step S1609).

Then, the video processed by the video output control unit 504 is output by the image display unit 107. Furthermore, the audio output control unit 522 outputs the audio signal from each speaker to generate the sound image localized at the display position of the object at the gazing point (step S1610).

FIG. 5 illustrates the functional configuration example in which the image creation processing based on the gazing point of the user is executed by the edge, that is, the content reproduction device 100. As a modification, the image creation processing based on the gazing point of the user may be performed by a server (for example, an artificial intelligence server) on the cloud. One effect of performing the processing on the server side is that deep learning and relearning may be performed by collecting learning data from a large number of edges while providing the content created on the basis of the gazing point of the user to the edge.

Figure 23:
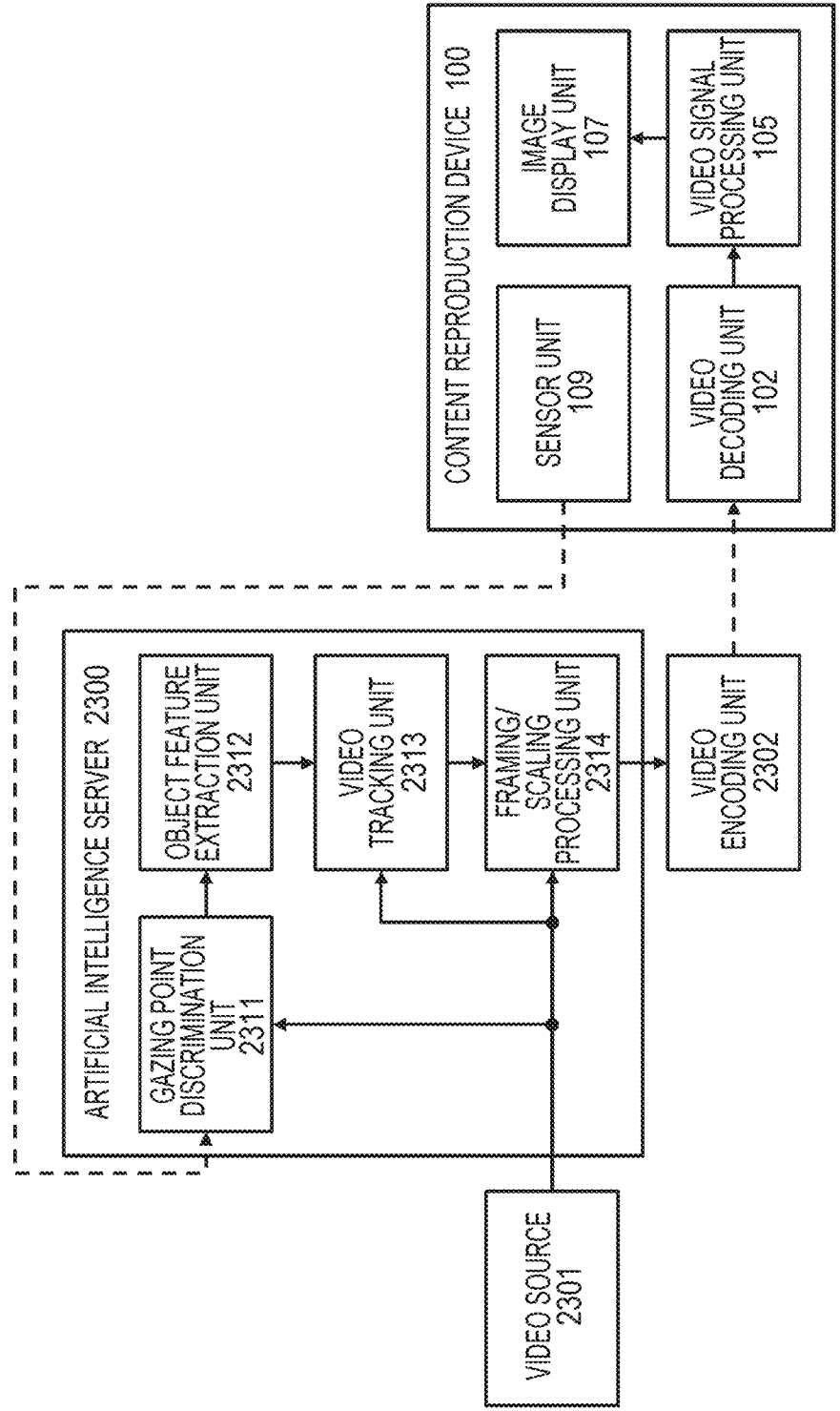
FIG. 23 is a view illustrating a functional configuration example of an artificial intelligence server 2300 that performs image creation on the basis of the gazing point of the user.

FIG. 23 illustrates a functional configuration example of an artificial intelligence server 2300 that performs the image creation on the basis of the gazing point of the user. The artificial intelligence server 2300 is assumed to be installed on the cloud. Furthermore, a video source 2301 as a target of the image creation processing by the artificial intelligence server 2300 may be any of a broadcasting station, a stream distribution server, or a recording medium.

On the content reproduction device 100 side, for example, the framing or scaling processing of the video occurs by a manual operation such as an operation of a remote controller or another controller and a voice command by the user. Alternatively, the framing or scaling processing is automatically activated on the basis of an analysis result of source video from the video source 2301. The sensor information detected by the sensor unit 109 on the content reproduction device 100 side is input to a gazing point discrimination unit 2311 in the artificial intelligence server 2300 via a network. The gazing point discrimination unit 2311 discriminates the gazing point gazed by the user in the video input from the video source 2301. The gazing point discrimination unit 2311 performs the gazing point discrimination processing using the machine learning model of which deep learning is performed so as to estimate the gazing point of the user from the sensor information and the video stream.

The object feature extraction unit 2312 extracts the feature of the object corresponding to the gazing point discriminated by the gazing point discrimination unit 2311. The object feature extraction unit 2312 performs the feature extraction processing of the object using the machine learning model of which deep learning is performed so as to estimate the feature of the object corresponding to the gazing point from the gazing point and the video stream.

The video tracking unit 2313 tracks the object at the gazing point in the video stream on the basis of the feature of the object at the gazing point extracted by the object feature extraction unit 2312, and outputs the coordinates of the object at the gazing point in the video frame.

A framing/scaling processing unit 2314 performs the framing and zooming processing based on the coordinates of the object gazed by the user on the basis of the coordinates of the object output from the video tracking unit 2313. For example, the framing/scaling processing unit 2314 performs the framing processing such that the coordinates of the object gazed by the user are at the center of the frame, and further zooms in to the object gazed by the user (refer to FIGS. 18 to 22).

Then, the video stream subjected to the image creation processing in the artificial intelligence server 2300 is subjected to encoding processing in compliance with a predetermined encoding standard such as MPEG-2 systems by a video encoding unit 2302, and then distributed to the content reproduction device 100.

On the content reproduction device 100 side, the received encoded video stream is subjected to decoding processing by the video decoding unit 102, subjected to the video signal processing including image quality enhancement and the like by the video signal processing unit 105, and then displayed by the image display unit 107.

Furthermore, FIG. 17 illustrates the functional configuration example in which the image sound matching processing when performing the image creation based on the gazing point of the user by the edge, that is, the content reproduction device 100. As a modification, the image sound matching processing may be performed by a server (for example, an artificial intelligence server) on the cloud. One effect of performing the processing on the server side is that deep learning and relearning may be performed by collecting learning data from a large number of edges while providing the content of which image creation or image sound matching processing is performed on the basis of the gazing point of the user to the edge.

Figure 24:
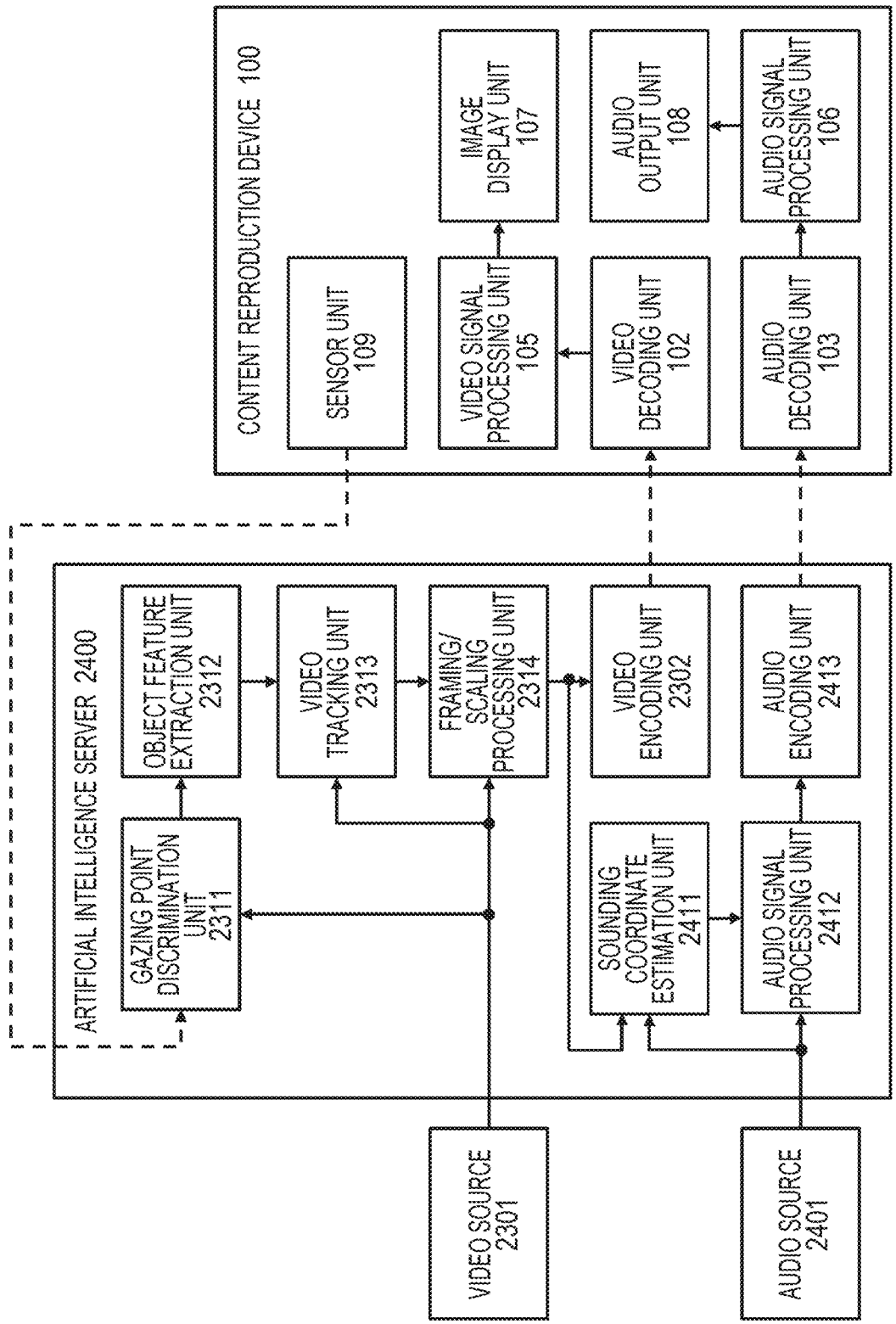
FIG. 24 is a view illustrating a functional configuration example of an artificial intelligence server 2400 that performs the image creation and image sound matching processing on the basis of the gazing point of the user.

FIG. 24 illustrates a functional configuration example of an artificial intelligence server 2400 that performs the image creation and image sound matching processing on the basis of the gazing point of the user. Note that, functional modules having the same names and similar functions as those illustrated in FIG. 23 are denoted by the same reference numerals, and description thereof is herein omitted or minimized. The artificial intelligence server 2400 is assumed to be installed on the cloud. Furthermore, an audio source 2401 as a target of the image sound matching processing by the artificial intelligence server 2400 is a content integrated with the video source 2301 and provided from a broadcasting station, a stream distribution server, or a recording medium.

The sounding coordinate estimation unit 2411 receives the video stream after being subjected to the framing and zooming processing from the framing/scaling processing unit 2314, and receives the audio stream from the audio source 2401. Then, the sounding coordinate estimation unit 2411 estimates the display position of the sounding object serving as the sound source in the video after being subjected to the framing and zooming processing, and outputs the same as the sounding coordinates. The sounding coordinate estimation unit 2411 performs estimation processing of the sounding coordinates of each sounding object by using the machine learning model of which deep learning is performed so as to estimate the sounding coordinates of the object serving as the sound source in the video from the input video stream and audio stream.

In a case where the audio signals of a plurality of objects are superimposed on the audio stream, the sounding coordinate estimation unit 2411 separates the waveform of the audio signal for each object from the original audio stream, and estimates the sounding coordinates for each separated object. In a case where the audio stream follows the object-based audio, since the individual sounding objects are not mixed, separation processing of the audio signals for each object is not necessary, and the sounding coordinate estimation unit 2411 may easily calculate the display position, size, and direction of each object after the framing and zooming processing on the basis of the localization information included in the meta information.

It is also possible to transmit specification information of the display used by the image output unit 107 from the edge, that is, the content reproduction device 100 side to the artificial intelligence server 2400. In a case where the image output unit 107 uses the 2D display, the sounding coordinate estimation unit 2411 estimates two-dimensional sounding coordinates. Furthermore, in a case where the image output unit 107 is a 3D display having depth information such as a holographic display, the sounding coordinate estimation unit 2411 estimates three-dimensional sounding coordinates. Furthermore, in a case where a plurality of sounding objects is estimated, the sounding coordinate estimation unit 2411 may also estimate the volume for each sounding object (or a volume ratio between the sounding objects).

The audio signal processing unit 2412 performs the audio signal processing for generating the sound image of each sounding object in the video according to the sounding coordinates estimated by the sounding coordinate estimation unit 2411. For example, the configuration of the speaker used in the audio output unit 108 may be transmitted from the edge, that is, the content reproduction device 100 side. The audio signal processing unit 2412 determines the direction and the volume of the sound at the sounding position for each sounding object for which the sounding coordinates are estimated, determines the combination of speakers for generating the sound image, and sets the volume and the direction of the sound output from each speaker. In a case where the audio signal is the object-based audio, the audio signal processing unit 2412 does not mix individual sounding objects, and outputs information such as the sounding coordinates of each sounding object as meta information.

Then, the audio stream subjected to the sound image matching processing in the artificial intelligence server 2400 is subjected to encoding processing in compliance with a predetermined encoding standard such as MP3 or HE-AAC by an audio encoding unit 2413, and then distributed to the content reproduction device 100.

On the content reproduction device 100 side, the received encoded audio stream is subjected to the decoding processing by the audio decoding unit 103, subjected to the audio signal processing including the sound quality enhancement and the like by the audio signal processing unit 106, and then output by the audio output unit 108.

Furthermore, the video subjected to the processing such as framing and zooming by the video output control unit 504 at step S905 or step S1607 may be returned to a state before the video output processing is performed. Specifically, for example, in a case where the user performs a predetermined operation, the framed or zoomed video may be returned to the input video before the processing is performed. These operations may include, for example, a user's gesture such as moving a hand in front of the screen display unit 107 or moving a face away from the screen display unit 107. Furthermore, control of the line of sight by the user including bringing the line of sight to a predetermined position or a predetermined object inside and outside the screen display unit 107 may be included. Furthermore, the utterance including a predetermined command by the user may be included. Furthermore, an operation on a predetermined object displayed on the screen, an operation of an operation unit provided in the main body of the content reproduction device 100, or an operation of a remote controller for operating the content reproduction device 100 may be included.

D-2. Image Creation Based on Gazing Point (2)

Figure 10:
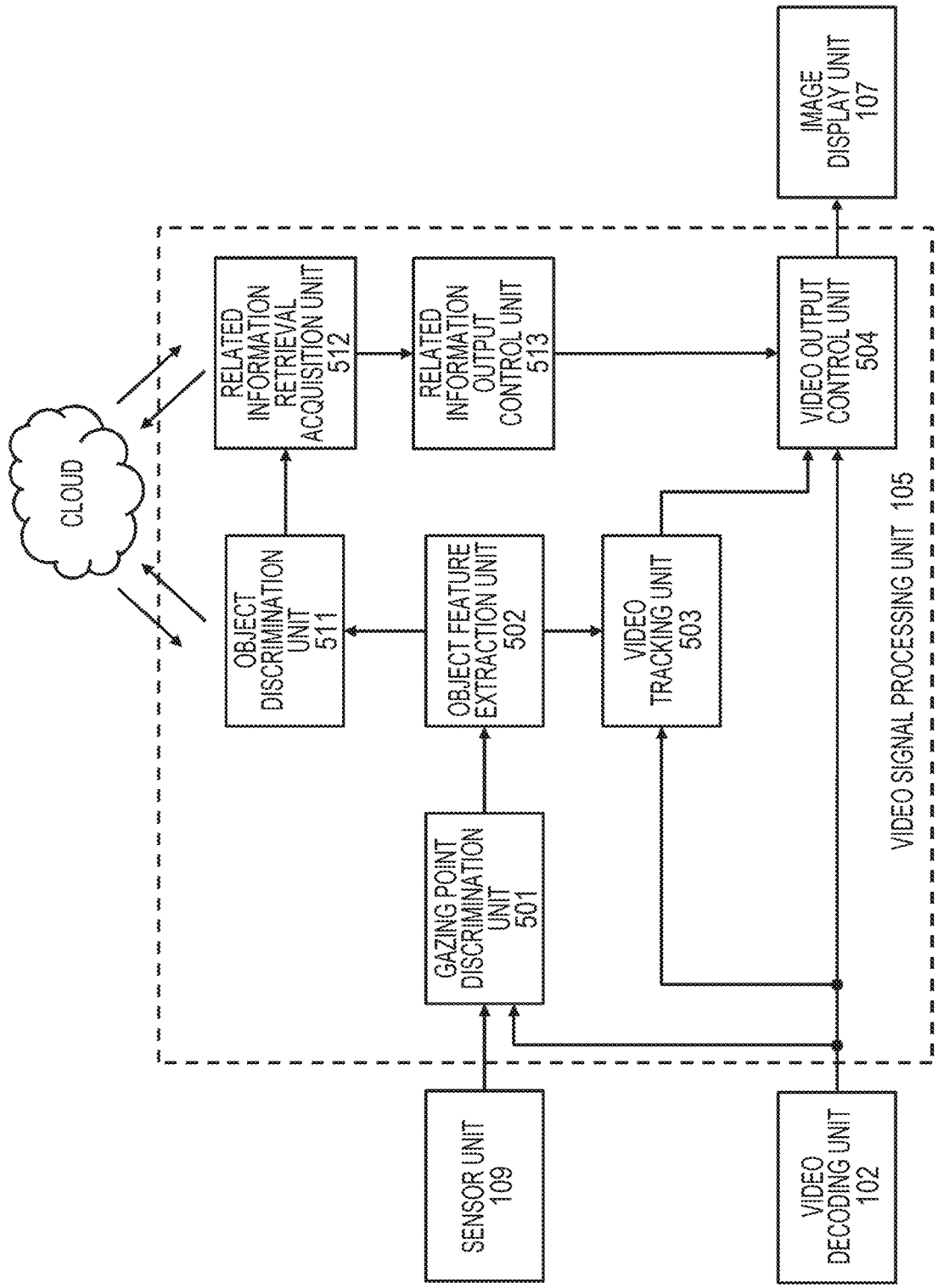
FIG. 10 is a view illustrating another functional configuration example of the video signal processing unit 105.

FIG. 10 illustrates another functional configuration example of the video signal processing unit 105 that performs the image creation on the basis of the gazing point of the user. The illustrated video signal processing unit 105 is provided with the gazing point discrimination unit 501, the object feature extraction unit 502, the video tracking unit 503, the video output control unit 504, an object discrimination unit 511, a related information retrieval acquisition unit 512, and a related information output control unit 513. Note that, since the gazing point discrimination unit 501, the object feature extraction unit 502, the video tracking unit 503, and the video output control unit 504 are the same as the functional modules having the same name and the same reference number in FIG. 5, a detailed description thereof is herein omitted or the description is minimized.

The object discrimination unit 511 discriminates the object on the basis of the feature of the object at the gazing point extracted by the object feature extraction unit 502. The object discrimination unit 511 may access information resources on the cloud as necessary to perform the object discrimination processing. For example, in a case of the video of sport game watching, it is discriminated who a player discriminated as the gazing point is, and in a case of the video of a movie or a drama, it is discriminated who a performer discriminated as the gazing point is. Note that, the object is not limited to a person, and may be an object (a signboard (including digital signage) arranged in a stadium, a car, studio set furniture, furnishings and the like) appearing in the video.

The object discrimination unit 511 may perform the object discrimination processing by using the machine learning model of which deep learning is performed so as to estimate the object from the feature of the object.

The related information retrieval acquisition unit 512 performs processing of retrieving and acquiring the related information of the object discriminated by the object discrimination unit 511 on the cloud through the external interface unit 110. For example, in a case where the object is an athlete, related information such as a profile, results, and a related book of the athlete are retrieved. Furthermore, in a case where the object is an entertainer who appears in a movie or a drama, related information such as a movie or a television program in which the entertainer has appeared in the past or a related book are retrieved. Furthermore, when the object is a car, related information such as specifications and dealers of the car are retrieved.

The related information retrieval acquisition unit 512 may perform retrieval acquisition processing of the related information by using the machine learning model of which deep learning is performed so as to perform retrieval processing by estimating a retrieval method (retrieval keyword or retrieval conditional expression) and the like of the related information according to the object. Furthermore, although the processing in which the related information retrieval acquisition unit 512 retrieves on the cloud to acquire the related information of the object is herein described, the related information retrieval acquisition unit 512 may perform the retrieval acquisition processing of acquiring the related information from a storage unit of the content reproduction device 100 not illustrated or an external storage area connected to the content reproduction device 100. Furthermore, the related information regarding the object may be acquired from the meta information transmitted together with the video stream.

The related information output control unit 513 performs output control for presenting the related information of the object acquired by retrieving on the cloud by the related information retrieval acquisition unit 512 to the user. There are various methods of presenting the related information to the user. For example, the related information may be superimposed on the video stream as auxiliary data such as on screen display (OSD) or subtitles to be displayed. Alternatively, the related information output control unit 513 may convert the related information into voice data, superimpose the same on the audio stream of the content, and output the audio data. In this embodiment, it is assumed that the related information is displayed using an OSD function. The related information output control unit 513 generates the OSD from the related information of the object acquired by the related information retrieval acquisition unit 512 and outputs the same to the video output control unit 504.

The video output control unit 504 performs the output control of the video stream on the basis of the coordinates of the object output from the video tracking unit 503 as described above. The video output control herein mentioned includes the framing, zooming, resolution conversion, and luminance dynamic range conversion for the object at the gazing point of the user and objects around the gazing point.

Furthermore, the video output control unit 504 superimposes the OSD generated by the related information output control unit 513 on the video stream. In a case where the framing and zooming is performed on the object at the gazing point of the user or the objects around the gazing point, the video output control unit 504 performs OSD superimposition processing in consideration of the position of the object that moves in accordance with the framing and zooming.

Then, the video output control unit 504 performs the adjustment processing according to the type of the display on the video stream on which other image quality processing is performed. The video processed by the video output control unit 504 is output by the image display unit 107.

Note that, a mode of displaying the related information of the object is not limited to the OSD. For example, a balloon, a pop-up window, and a band for displaying the related information on any of upper, lower, left, and right edges of the screen may be generated. Furthermore, in a case where the related information is displayed by the OSD and the like on the 3D display, a 3D depth, a size, and a direction of a display position of the OSD are set with reference to the display position of the target object. In any display mode, it is desirable to display the related information for any object in an easy-to-understand manner while preventing interference with the video of the object at the gazing point of the user and hindrance of the gazing of the user.

Furthermore, the gazing point discrimination unit 501 may discriminate the gazing point by using discrimination information regarding the object discriminated by the object discrimination unit 511. For example, information regarding the discrimination result of the object already discriminated by the object feature extraction unit 502 may be stored in a storage unit not illustrated, and the gazing point discrimination unit 501 may discriminate the gazing point using the discrimination information. In this case, for example, the gazing point discrimination unit 501 may determine the object gazed by the user by using the name of the object included in the user utterance acquired by the sensor unit 109. Furthermore, in a case where the meta information transmitted together with the video stream includes the information regarding the object, the gazing point discrimination unit 501 may discriminate the gazing point by using the meta information. Note that, the meta information may be included in the video stream to be transmitted, or may be acquired from an external server or a recording medium through a path different from that of the video stream. Similarly, the gazing point discrimination unit 501 may discriminate the gazing point by using the related information of the object acquired by the related information retrieval acquisition unit 512.

Figure 11:
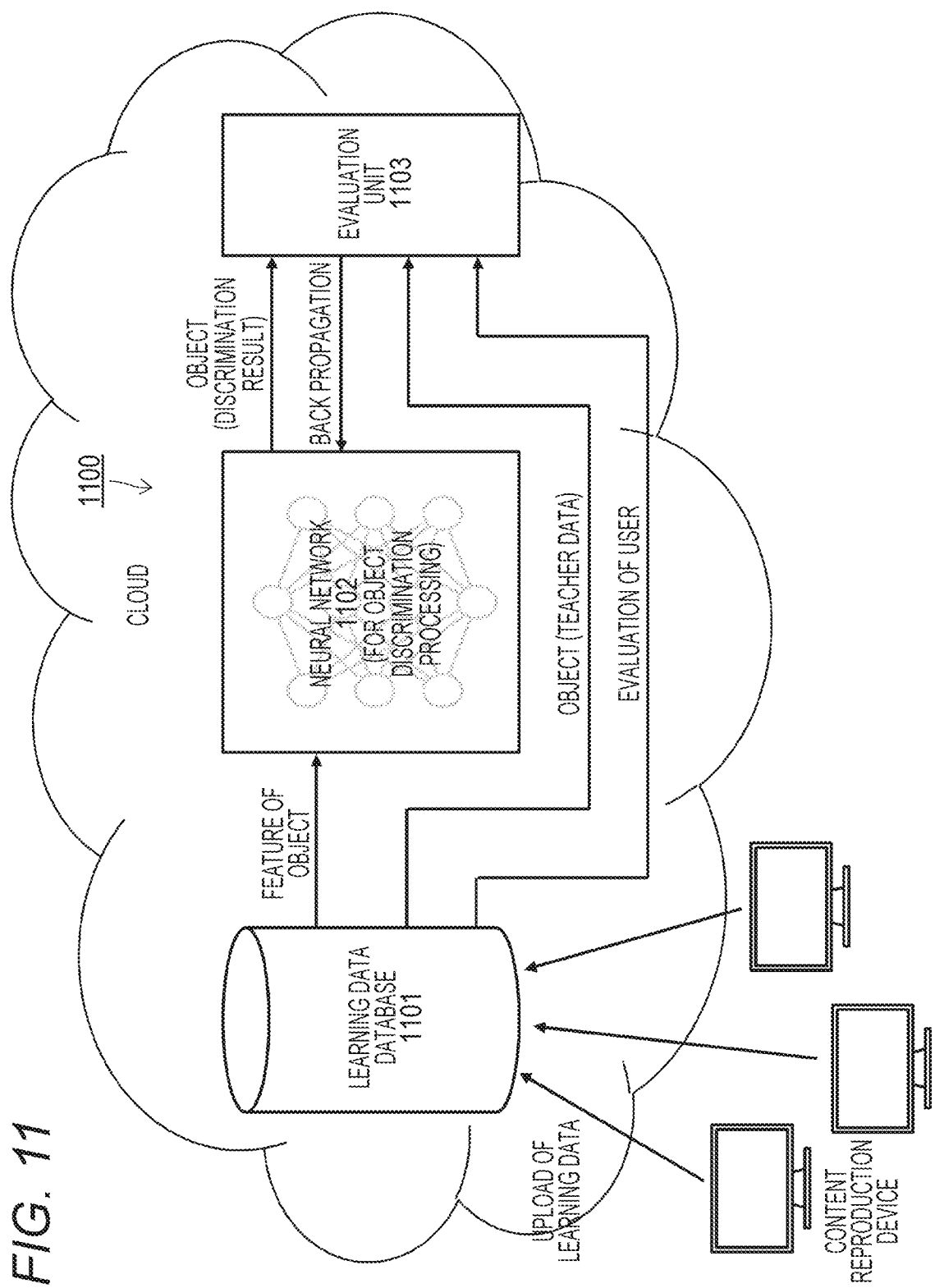
FIG. 11 is a view illustrating a functional configuration example of an artificial intelligence server 1100 that performs deep learning on a neural network for object discrimination processing.

The machine learning model used in the object discrimination processing by the object discrimination unit 511 is represented by, for example, the neural network. FIG. 11 schematically illustrates a functional configuration example of an artificial intelligence server 1100 that performs deep learning on the neural network used by the object discrimination unit 511. As an example, the artificial intelligence server 1100 is constructed on the cloud, but this may be constructed with edge computing such as an edge or a mobile edge.

In a learning data database 1101, enormous learning data uploaded from a large number of content reproduction devices 100 (for example, television reception devices of respective homes) are accumulated. The learning data includes the feature of the object at the gazing point discriminated by the object feature extraction unit 502 in the content reproduction device 100, the object discriminated by the object discrimination unit 511 at that time, and an evaluation value for the discrimination result. The evaluation value may be, for example, a simple evaluation (whether it is OK or NG) of the user for the discriminated object (or the video output on the basis of the discrimination result).

A neural network 1102 for the object discrimination processing receives the feature of the object read from the learning data database 1101 as the learning data, and outputs a discrimination result of the object at that time. The neural network 1102 accesses information resources on the cloud as necessary to perform the object discrimination processing.

An evaluation unit 1103 evaluates a learning result of the neural network 1102. Specifically, the evaluation unit 1103 receives the discrimination result of the object output from the neural network 1102, the discrimination result of the object (teacher data) and the user evaluation combined with the input to the neural network 1102 read from the learning data database 1101, and defines a loss function based on a difference between the output from the neural network 1102 and the teacher data. Note that, it is possible to calculate the loss function by weighting so as to increase the weight of the difference from the teacher data having a high evaluation result of the user and decrease the weight of the difference from the teacher data having a low evaluation result of the user. Then, the evaluation unit 1103 performs learning of the neural network 1102 by back propagation so as to minimize the loss function.

Figure 12:
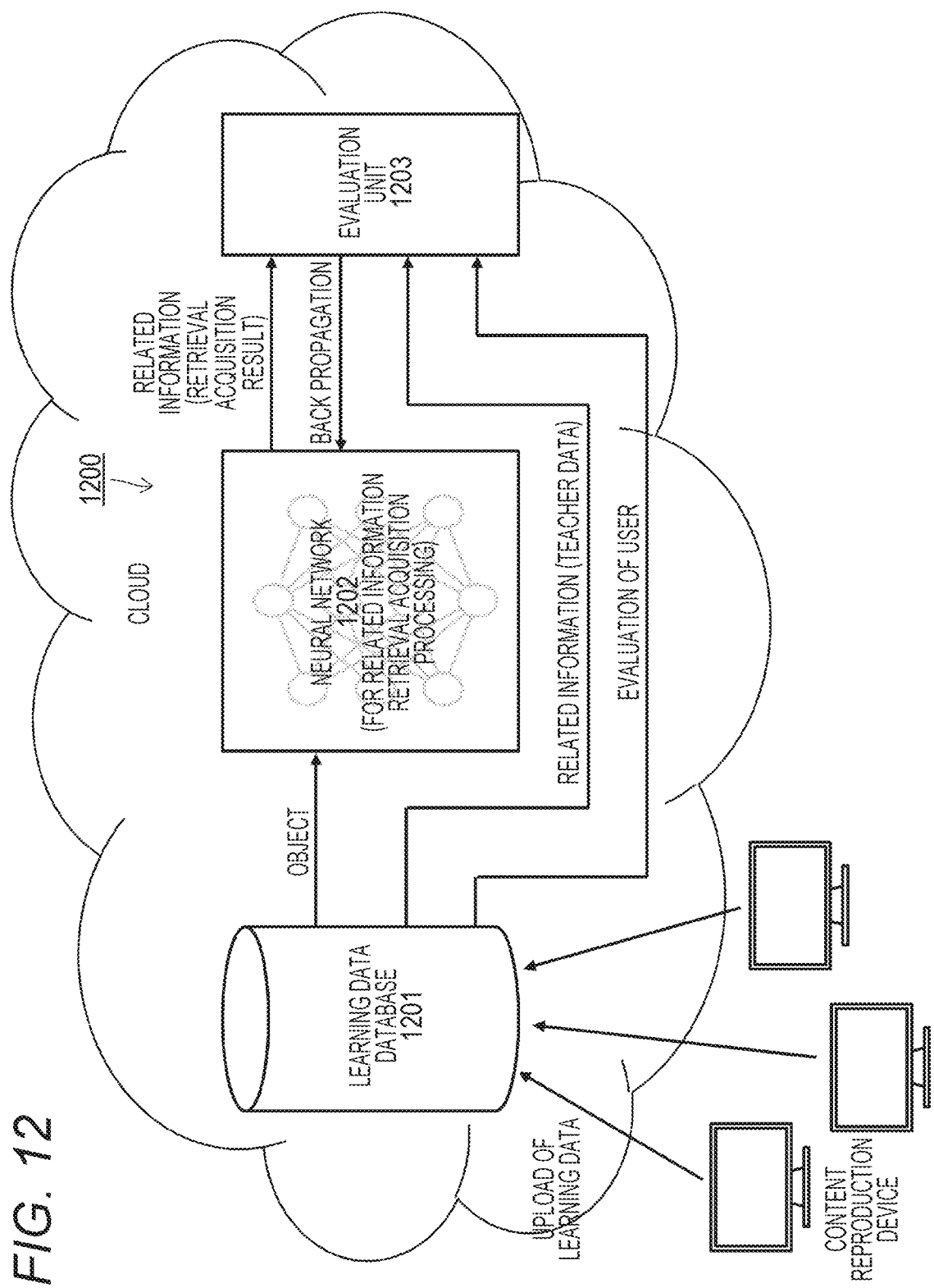
FIG. 12 is a view illustrating a functional configuration of an artificial intelligence server 1200 that performs deep learning on a neural network for related information retrieval acquisition processing.

Furthermore, the machine learning model used for the processing of retrieving the related information of the object on the cloud to acquire by the related information retrieval acquisition unit 512 is represented by, for example, the neural network. FIG. 12 schematically illustrates a functional configuration example of an artificial intelligence server 1200 that performs deep learning on the neural network used by the related information retrieval acquisition unit 512. As an example, the artificial intelligence server 1200 is constructed on the cloud, but this may be constructed with edge computing such as an edge or a mobile edge.

In a learning data database 1201, enormous learning data uploaded from a large number of content reproduction devices 100 (for example, television reception devices of respective homes) are accumulated. The learning data includes the object discriminated by the object discrimination unit 511 in the content reproduction device 100 on the basis of the feature of the object, the related information retrieved on the cloud to be acquired by the related information retrieval acquisition unit 512 for the object, and an evaluation value for a retrieval acquisition result. The evaluation value may be, for example, a simple evaluation (whether it is OK or NG) of the user for the related information retrieved and acquired (or the OSD displayed on the basis of the related information).

A neural network 1202 for related information retrieval and acquisition receives the object read from the learning data database as the learning data, and outputs the related information of the object. The neural network 1202 performs processing of retrieving on the cloud the related information of the object to acquire.

An evaluation unit 1203 evaluates a learning result of the neural network 1202. Specifically, the evaluation unit 1203 receives the related information output from the neural network 1202, the related information (teacher data) and the evaluation of the user combined with the input to the neural network 1202 read from the learning data database 1201, and defines a loss function based on a difference between the output from the neural network 1202 and the teacher data. Note that, it is possible to calculate the loss function by weighting so as to increase the weight of the difference from the teacher data having a high evaluation result of the user and decrease the weight of the difference from the teacher data having a low evaluation result of the user. Then, the evaluation unit 1203 performs learning of the neural network 1202 by back propagation so as to minimize the loss function.

Figure 13:
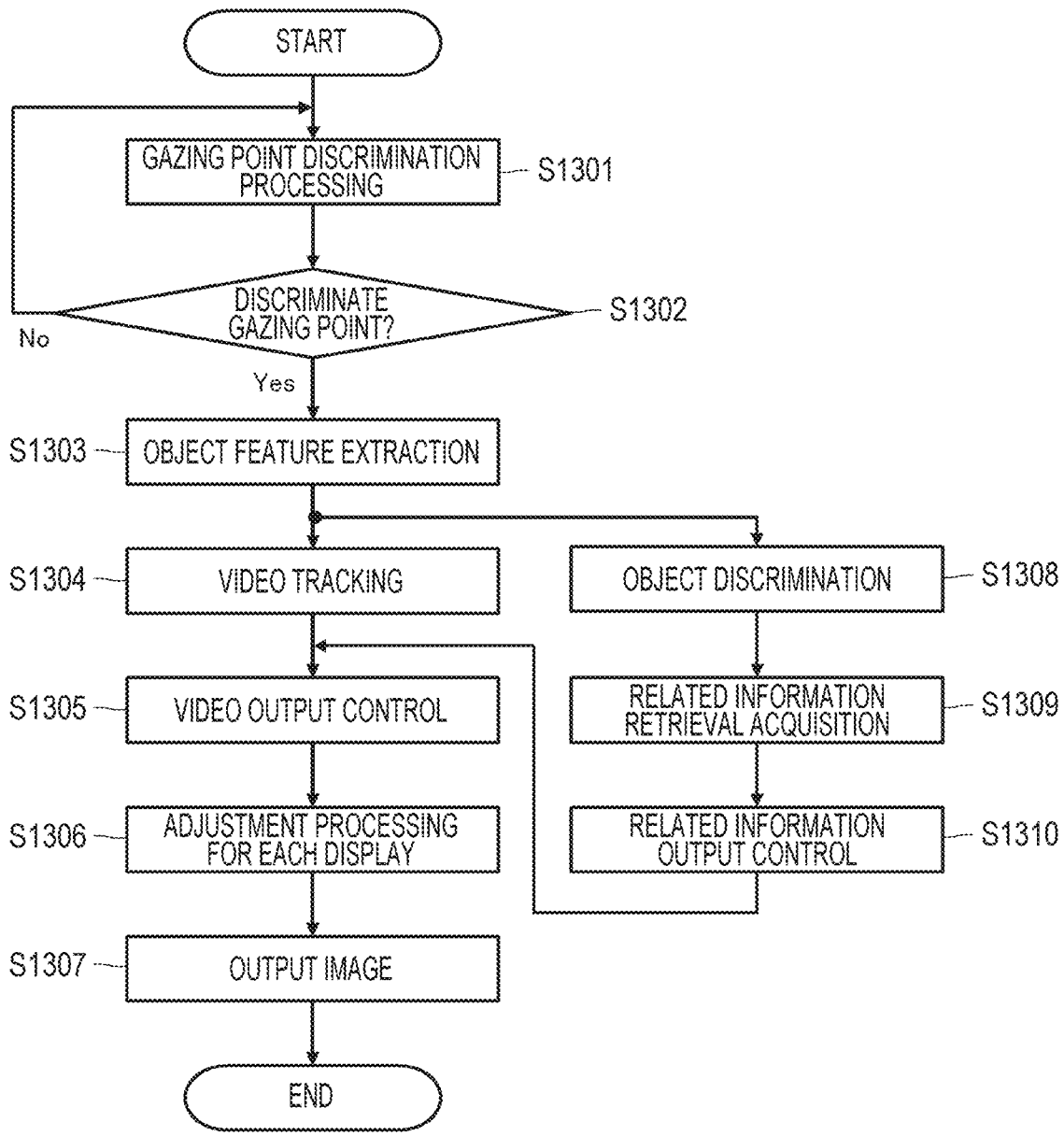
FIG. 13 is a flowchart illustrating a procedure of video signal processing performed in the video signal processing unit 105 illustrated in FIG. 10.

FIG. 13 illustrates a procedure of the video signal processing performed by the video signal processing unit 105 illustrated in FIG. 10 as a flowchart.

First, the gazing point discrimination unit 501 receives the decoded video stream from the video decoding unit 102, receives the sensor information from the sensor unit 109, and discriminates the gazing point gazed by the user in the video on the basis of the sensor information (step S1301).

In a case where the gazing point discrimination unit 501 may discriminate the gazing point of the user (Yes at step S1302), the object feature extraction unit 502 extracts the feature of the object corresponding to the gazing point discriminated by the gazing point discrimination unit 501 (step S1303).

Next, the video tracking unit 503 tracks the object at the gazing point in the video stream on the basis of the feature of the object at the gazing point extracted by the object feature extraction unit 502, and outputs the coordinates of the object at the gazing point in the video frame (step S1304).

Furthermore, the object discrimination unit 511 discriminates the object on the basis of the feature of the object at the gazing point extracted by the object feature extraction unit 502. The object discrimination unit 511 accesses information resources on the cloud as necessary to perform the object discrimination processing (step S1308).

The related information retrieval acquisition unit 512 performs processing of retrieving the related information of the object discriminated by the object discrimination unit 511 on the cloud to acquire (step S1309).

The related information output control unit 513 performs output control for presenting the related information of the object acquired by retrieving on the cloud by the related information retrieval acquisition unit 512 to the user by the OSD, for example (step S1310).

Next, the video output control unit 504 performs the output control of the video stream on the basis of the coordinates of the object output from the video tracking unit 503 (step S1305). The video output control herein mentioned includes framing, zooming, resolution conversion, and luminance dynamic range conversion for the object at the gazing point and objects around the gazing point. Furthermore, the video output control unit 504 superimposes the OSD generated by the related information output control unit 513 on the video stream.

Various types of display devices such as a liquid crystal display, an organic EL display, a self-luminous display, a 3D display, and a holographic display are assumed as the image display unit 107. Therefore, the video output control unit 504 performs adjustment processing according to the type of the display on the video stream subjected to the framing, zooming, and other image quality processing based on the gazed object (step S1306).

Then, the video processed by the video output control unit 504 is output by the image display unit 107 (step S1307).

FIG. 10 illustrates the configuration example of the video signal processing unit 105 that performs the processing of retrieving the information related to the object gazed by the user to output; note that, as a modification, a server (for example, an artificial intelligence server) on the cloud may perform similar processing. One effect of performing the processing on the server side is that deep learning and relearning may be performed by collecting learning data from a large number of edges while providing the related information of the object to the edge together with the content.

Figure 25:
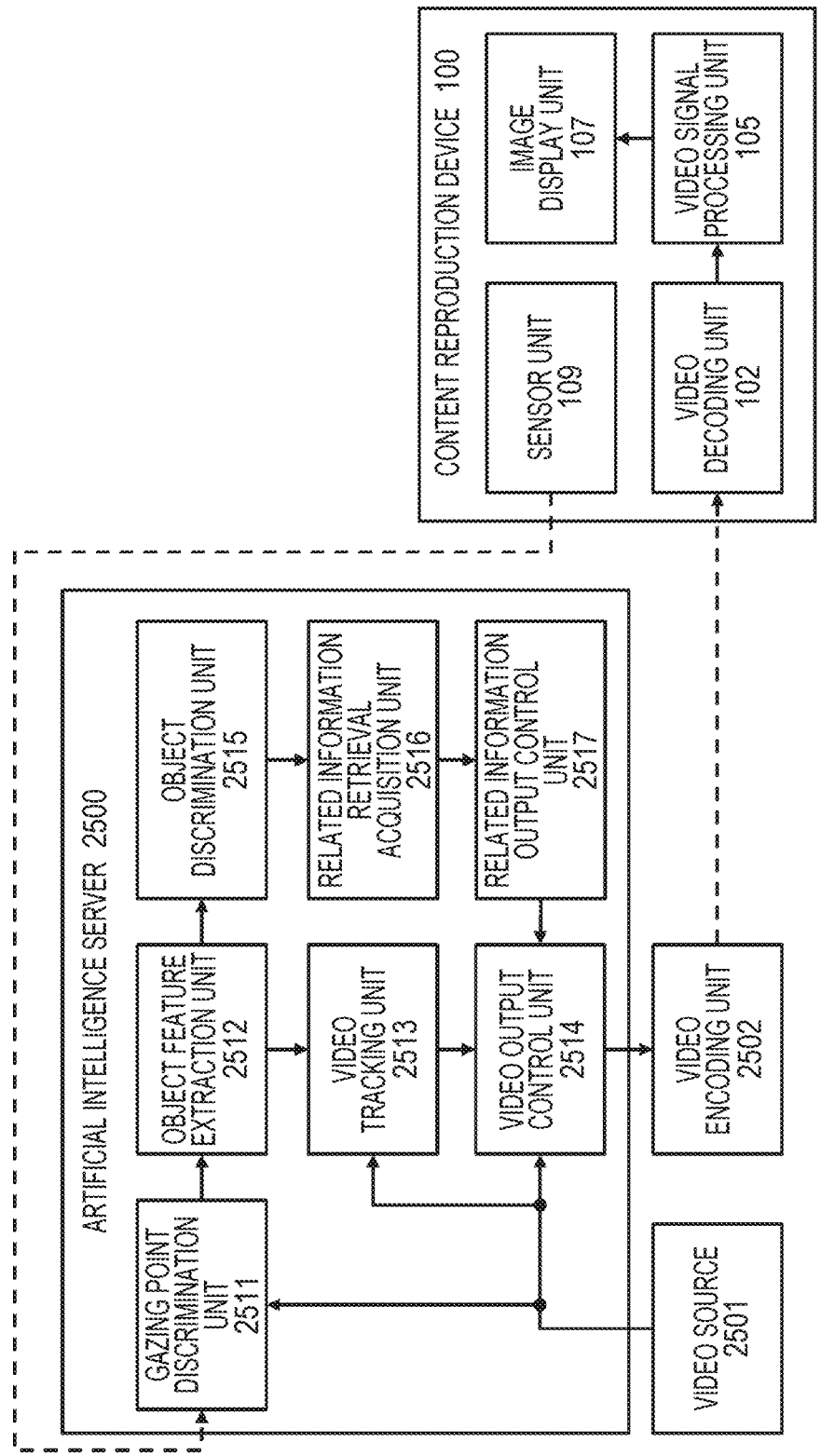
FIG. 25 is a view illustrating a functional configuration example of an artificial intelligence server 2500 that outputs related information of the object gazed by the user.

FIG. 25 illustrates a functional configuration example of an artificial intelligence server 2500 that outputs the related information of the object gazed by the user. The artificial intelligence server 2500 is assumed to be installed on the cloud. Furthermore, a video source 2501 as a target of the image creation processing by the artificial intelligence server 2500 may be any of a broadcasting station, a stream distribution server, or a recording medium.

The sensor information detected by the sensor unit 109 on the content reproduction device 100 side is input to a gazing point discrimination unit 2511 in the artificial intelligence server 2500 via a network. The gazing point discrimination unit 2511 discriminates the gazing point gazed by the user in the video input from the video source 2501. Note that, since the gazing point discrimination unit 2511, an object feature extraction unit 2512, a video tracking unit 2513, and a video output control unit 2514 are the same as the functional modules having the same name and the same reference number in FIG. 5, a detailed description thereof is herein omitted or the description is minimized.

The object feature extraction unit 2512 extracts the feature of the object corresponding to the gazing point discriminated by the gazing point discrimination unit 2511. The object discrimination unit 2515 discriminates an object on the basis of the feature of the object at the gazing point extracted by the object feature extraction unit 502. The object discrimination unit 2515 may perform the object discrimination processing by using a machine learning model of which deep learning is performed so as to estimate the object from the feature of the object.

A related information retrieval acquisition unit 2516 performs processing of retrieving the related information of the object discriminated by the object discrimination unit 2515 on the cloud to acquire. The related information retrieval acquisition unit 2516 may perform retrieval acquisition processing of the related information by using the machine learning model of which deep learning is performed so as to perform retrieval processing by estimating a retrieval method (retrieval keyword or retrieval conditional expression) and the like of the related information according to the object.

A related information output control unit 2517 performs output control for presenting the related information of the object acquired by retrieving on the cloud by the related information retrieval acquisition unit 2516 to the user. There are various methods of presenting the related information to the user. The related information output control unit 2517 may generate the related information in a format of auxiliary data such as subtitles, meta information of the video stream and the like.

The video output control unit 2514 performs the output control of the video stream on the basis of the coordinates of the object output from the video tracking unit 2513 as described above. Furthermore, the video output control unit 2514 outputs the related information generated by the related information output control unit 2517 in a format of subtitles, auxiliary data, meta information and the like together with the video stream.

Then, the video stream subjected to the image creation processing in the artificial intelligence server 2500 is subjected to encoding processing in compliance with a predetermined encoding standard such as MPEG-2 systems by a video encoding unit 2502, and then distributed to the content reproduction device 100.

On the content reproduction device 100 side, the video decoding unit 102 performs the decoding processing on the received encoded video stream, and the auxiliary data decoding unit 104 performs the decoding processing on the received auxiliary data stream. Then, the decoded video stream is subjected to the video signal processing including the image quality enhancement and the like by the video signal processing unit 105, and then displayed by the image display unit 107 together with the related information.

D-3. Image Sound Matching Processing

For example, in the content of a movie or a drama, there is a plurality of sound sources such as a plurality of characters appearing in the video frame. Furthermore, even in a scene in which only one character appears, when the character moves, the sound source moves. Furthermore, in a case where the framing and zooming is performed on the object at the gazing point of the user or the objects around the gazing point as the video signal processing, the position of the object that moves in accordance with the framing and zooming moves from the position in an original content (as described above). In short, the position of the sound source present in the video frame is indefinite. For example, in a 2D display and a 3D display of a large screen, an image sound mismatch phenomenon in which an image of the object (sound source) appearing on the screen and a sound image thereof do not match is remarkably perceived by the user. For example, in a case of using a display with improved depth perception such as a holographic display, the mismatch between the image and the sound image in the depth direction becomes remarkable. Due to the image sound mismatch phenomenon, it becomes difficult for the user to identify the sound source (of which object the voice is), and the user feels uncomfortable.

Therefore, the content reproduction device 100 according to this embodiment performs processing (hereinafter, also referred to as "image sound matching processing") of matching the image of the object serving as the sound source with the sound image thereof. Specifically, in the content reproduction device 100 according to this embodiment, the image of the object serving as the sound source appearing in the video is detected, and optimal sounding coordinates for emitting the audio signal of the sound source are estimated on the basis of the display position of the object in the video frame. Then, the audio output unit 108 is allowed to perform processing of generating the sound image of the sound source at the estimated sounding position. The sound image generation processing includes processing of determining a direction and a volume of the sound at the sounding position and determining a combination of speakers for generating the sound image. By performing the image sound matching processing, reality of the content to be reproduced increases, and realistic feeling may be provided to the user. When the image sound matching processing is applied to the 3D display, the effect thereof is large.

Figure 14:
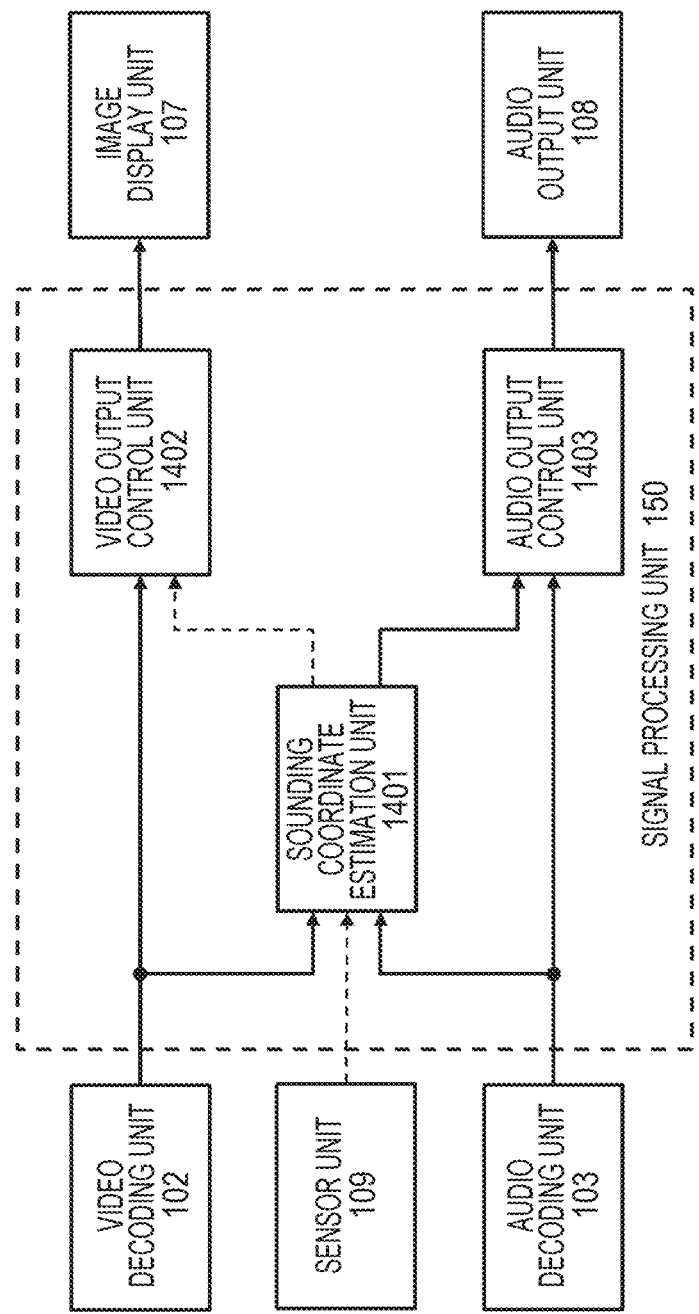
FIG. 14 is a view illustrating a functional configuration example of the signal processing unit 150 that performs image sound matching processing.

FIG. 14 illustrates a functional configuration example of the signal processing unit 150 that performs the image sound matching processing. The illustrated signal processing unit 150 is a functional module in which the functions of the video signal processing unit 105 and the audio signal processing unit 106 in FIG. 2 are integrated, and is provided with a sounding coordinate estimation unit 1401, a video output control unit 1402, and an audio output control unit 1403. The decoded video stream from the video decoding unit 102 and the decoded audio stream from the audio decoding unit 103 are input to the signal processing unit 150.

The decoded video stream from the video decoding unit 102 and the decoded audio stream from the audio decoding unit 103 are input to the sounding coordinate estimation unit 1401. Note that, as illustrated in FIG. 5, in a case where the framing and zooming are performed on the object at the gazing point of the user and the objects around the gazing point, in the sounding coordinate estimation unit 1401, the framing and zooming processing of the video is performed on the basis of the sensor information and the like, and estimation processing of the sounding coordinates is performed on the basis of the processed video stream.

Then, the sounding coordinate estimation unit 1401 estimates the display position of the sounding object serving as the sound source in the video and outputs the same as the sounding coordinates. In a case where the audio signals of a plurality of objects are superimposed on the audio stream, the sounding coordinate estimation unit 1401 separates the waveform of the audio signal for each object from an original audio stream, and estimates the sounding coordinates for each separated object. Note that, in a case where the audio stream follows the object-based audio, since the individual sounding objects are not mixed, the sounding coordinate estimation unit 1401 does not need to perform separation processing of the audio signals for each object, and may easily calculate the display position, size, and direction of each sounding object on the basis of the localization information included in the meta information.

Furthermore, as described with reference to FIG. 5 and the like, in a case where the framing and zooming are performed on the object at the gazing point of the user and the objects around the gazing point, the sounding coordinate estimation unit 1401 estimates the gazing point on the basis of the sensor information, and estimates the sounding coordinates of each sounding object from the video in consideration of a result of framing and zooming on the basis of the gazing point.

In a case where the image output unit 107 uses the 2D display, the sounding coordinate estimation unit 1401 estimates two-dimensional sounding coordinates. Furthermore, in a case where the image output unit 107 is a 3D display having depth information such as a holographic display, the sounding coordinate estimation unit 1401 estimates three-dimensional sounding coordinates. Furthermore, in a case where a plurality of sounding objects is estimated, the sounding coordinate estimation unit 1401 may also estimate the volume for each sounding object (or a volume ratio between the sounding objects).

The sounding coordinate estimation unit 1401 performs estimation processing of the sounding coordinates of each sounding object by using the machine learning model of which deep learning is performed so as to estimate the sounding coordinates of the object serving as the sound source in the video from the input video stream and audio stream. Note that, there also is a method of detecting the sound source appearing in the video by video analysis and audio analysis of the input video stream and audio stream, and calculating the display position of the sound source on the screen, but it is difficult to perform calculation processing in real time. Therefore, as described above, in this embodiment, the sounding coordinate estimation unit 1401 uses the machine learning model.

The video output control unit 1402 performs the image quality enhancement processing such as super resolution processing or dynamic range expansion on the video stream. In a case where the framing and zooming of the video is determined by the sounding coordinate estimation unit 1401, the video output control unit 1402 performs the framing or zooming processing on the original video frame. Furthermore, the video output control unit 1402 performs adjustment processing according to the type of the display such as a liquid crystal display, an organic EL display, a self-luminous display, a 3D display, and a holographic display. Then, the video processed by the video output control unit 1402 is output by the image display unit 107.

The audio output control unit 1403 controls drive of the audio output unit 108 for generating the sound image of each sounding object in the video according to the sounding coordinates estimated by the sounding coordinate estimation unit 1401. Specifically, for example, in a case where the audio output unit 108 includes a plurality of speakers, the audio output control unit 1403 determines the direction and the volume of the sound at the sounding position for each sounding object for which the sounding coordinates are estimated, determines a combination of the speakers for generating the sound image, and sets the volume and the direction of the sound to be output from each speaker.

Note that, although not illustrated in FIG. 14, in a case of performing the framing and zooming, and image quality processing on the basis of the object gazed by the user in the video signal processing unit 105, the audio output control unit 1403 may perform the audio signal processing weighted on the basis of a gazing degree of the user; for example, sound quality enhancement processing such as band extension is applied or a special effect is applied to the audio signal emitted from the sounding object gazed by the user.

The machine learning model used in the sounding coordinate estimation processing by the sounding coordinate estimation unit 1401 is represented by the neural network. The deep learning of the neural network used by the sounding coordinate estimation unit 1401 may be performed on the artificial intelligence server 1500 illustrated in FIG. 15. Since the configuration and the operation of the artificial intelligence server 1500 are already described, the description thereof is herein omitted.

A procedure of the image sound matching processing executed in the signal processing unit 150 illustrated in FIG. 14 is similar to that in FIG. 16. Since the flowchart illustrated in FIG. 16 is already described, the description thereof is herein omitted.

FIG. 14 illustrates the functional configuration example in which the image sound matching processing of the content is executed by the edge, that is, the content reproduction device 100 side. As a modification, the image sound matching processing may be performed by a server (for example, an artificial intelligence server) on the cloud. For example, by using the artificial intelligence server 2400 illustrated in FIG. 24, the image sound matching processing may be performed on the content before the distribution to the edge. Since the artificial intelligence server 2400 is already described, the description thereof is herein omitted.

INDUSTRIAL APPLICABILITY

The present disclosure is heretofore described in detail with reference to the specific embodiment. However, it is obvious that one skilled in the art may modify or substitute the embodiment without departing from the scope of the present disclosure.

In this specification, the embodiment in which the present disclosure is applied to the television receiver has been mainly described, but the gist of the present disclosure is not limited thereto. The present disclosure may be similarly applied to various types of devices, for example, a personal computer, a smartphone, a tablet, a head-mounted display, a media player and the like that present, to a user, contents acquired by streaming or downloading via a broadcast wave or the Internet, or contents reproduced from a recording medium.

In short, the present disclosure is heretofore described in a form of an example and the content described in this specification should not be interpreted in a limited manner. In order to determine the scope of the present technology, claims should be taken into consideration.

Note that, the present disclosure may also have the following configuration.

(1) An information processing device provided with:
an estimation unit that estimates sounding coordinates at which a sound image is generated on the basis of a video stream and an audio stream;
a video output control unit that controls an output of the video stream; and
an audio output control unit that controls an output of the audio stream so as to generate the sound image at the sounding coordinates.

(2) The information processing device according to (1) above, in which
the estimation unit estimates the sounding coordinates using a machine learning model.

(3) The information processing device according to (1) or (2) above, in which
the estimation unit estimates the sounding coordinates for generating the sound image of a predetermined object serving as a sound source in video.

(4) The information processing device according to any one of (1) to (3) above, in which
the estimation unit estimates the sounding coordinates for generating the sound image of an object gazed by a user who views video and audio.

(5) The information processing device according to (4) above, further provided with:
a discrimination unit that discriminates a gazing point of the user who views video and audio, in which
the estimation unit estimates the sounding coordinates at which the sound image of the object gazed by the user is generated on the basis of a discrimination result of the discrimination unit.

(5-1) The information processing device according to (5) above, in which
the discrimination unit discriminates the gazing point of the user using a machine learning model.

(5-2) The information processing device according to (5) or (6) above, in which
the discrimination unit discriminates the gazing point of the user on the basis of a result of detecting a state related to the user.

(6) The information processing device according to (5) above, in which
the state includes at least one of a position of the user, a direction of a face or a line of sight of the user, the number of users, or an indoor environment in which viewing is performed.

(7) The information processing device according to (5) or (6) above, in which
the video output control unit performs rendering of the video on the basis of a result of discriminating a gazing degree of the user.

(8) The information processing device according to (7) above, in which
the video output control unit performs the rendering of the video using a machine learning model.

(9) The information processing device according to (7) or (8) above, in which
the rendering includes at least one of framing or zooming processing of the video.

(10) The information processing device according to any one of (7) to (9) above, in which
the video output control unit performs the rendering on the basis of a result of tracking the object gazed by the user.

(11) The information processing device according to any one of (7) to (10) above, in which
the estimation unit estimates the sounding coordinates on the basis of the video subjected to framing or zooming processing.

(11-1) The information processing device according to any one of (3) to (11) above, in which
the estimation unit estimates a sounding position of a sound image, and a direction and a volume of sound on the basis of a display position, a direction, or a size of an object in video.

(11-2) The information processing device according to any one of (1) to (11) above, in which
the audio output control unit generates the sound image by controlling a combination of speakers to be used among a plurality of usable speakers, and a direction and a volume of sound output from each speaker.

(11-3) The information processing device according to any one of (1) to (11) above, in which
the video output control unit controls an output of the video stream to a 2D or 3D display.

(12) The information processing device according to (9) above, in which the framing or zooming processing of the video is performed stepwise or at a predetermined speed to a target value.
(13) The information processing device according to any one of (1) to (12) above, in which
the video stream is a stream of 3D video.
(14) The information processing device according to (13) above, in which
the estimation unit generates the sound image according to a 3D depth or a direction of 3D display of a predetermined object serving as a sound source included in the video stream.
(15) The information processing device according to (13) above, in which
the estimation unit generates the sound image according to a 3D depth and a direction of 3D display of a predetermined object serving as a sound source included in the video stream.
(16) The information processing device according to any one of (1) to (15) above, further provided with:
a display unit capable of performing 3D display using binocular parallax.
(17) The information processing device according to any one of (5) to (13) above, further provided with:
an acquisition unit that acquires related information of the object discriminated on the basis of a feature of the object corresponding to the gazing point; and
a related information output control unit that controls an output of the acquired related information, in which
the video output control unit controls to output the related information together with the video stream.
(18) The information processing device according to (17) above that extracts the feature of the object or acquires the related information using a machine learning model.
(19) The information processing device according to any one of (1) to (18) above, in which
the audio stream includes meta information of object-based audio.
(20) An information processing method provided with:
an estimation step of estimating sounding coordinates at which a sound image is generated on the basis of a video stream and an audio stream;
a video output control step of controlling an output of the video stream; and
an audio output control step of controlling an output of the audio stream so as to generate the sound image at the sounding coordinates.

REFERENCE SIGNS LIST

100 Content reproduction device
101 Demultiplexer
102 Video decoding unit
103 Audio decoding unit
104 Auxiliary data decoding unit
105 Image signal processing unit
106 Audio signal processing unit
107 Image display unit
108 Audio output unit
109 Sensor unit
110 External user interface unit
150 Signal processing unit
410 Camera unit
411 to 413 Camera
420 User state sensor unit
430 Environment sensor unit
440 Device state sensor unit
450 User profile sensor unit
501 Gazing point discrimination unit
502 Object feature extraction unit
503 Video tracking unit
504 Video output control unit
511 Object discrimination unit
512 Related information retrieval acquisition unit
513 Related information output control unit
521 Sounding coordinate estimation unit
522 Audio output control unit
600 Artificial intelligence server (for gazing point discrimination)
601 Learning data database
602 Neural network
603 Evaluation unit
700 Artificial intelligence server (for object feature extraction)
701 Learning data database
702 Neural network
703 Evaluation unit
800 Artificial intelligence server (for video output control)
801 Learning data database
802 Neural network
803 Evaluation unit
1100 Artificial intelligence server (for object discrimination processing)
1101 Learning data database
1102 Neural network
1103 Evaluation unit
1200 Artificial intelligence server (for related information retrieval acquisition processing)
1201 Learning data database
1202 Neural network
1203 Evaluation unit
1401 Sounding coordinate estimation unit
1402 Video output control unit
1403 Audio output control unit
1501 Learning data database
1502 Neural network
1503 Evaluation unit
2300 Artificial intelligence server
2301 Video source
2302 Video decoding unit
2311 Gazing point discrimination unit
2312 Object feature extraction unit
2313 Video tracking unit
2314 Framing/scaling processing unit
2400 Artificial intelligence server
2401 Audio source
2411 Sounding coordinate estimation unit
2412 Audio signal processing unit
2413 Audio encoding unit
2500 Artificial intelligence server
2501 Video source
2502 Video encoding unit
2511 Gazing point discrimination unit
2512 Object feature extraction unit
2513 Video tracking unit
2514 Video output control unit
2515 Object discrimination unit
2516 Related information retrieval acquisition unit
2517 Related information output control unit

The invention claimed is:
1. An information processing device, comprising:
circuitry configured to:

discriminate a gazing point of a viewer of video content, wherein
the video content includes a video stream and an audio stream, and
the gazing point of the viewer is discriminated based on a state of the viewer;
estimate a plurality of sounding coordinates at which a sound image of an object gazed by the viewer is generated, wherein
the plurality of sounding coordinates is estimated based on the video stream, the audio stream, and the discriminated gazing point;
control an output of the video stream; and
control an output of the audio stream to generate the sound image at the plurality of sounding coordinates.

2. The information processing device according to claim 1, wherein the circuitry is further configured to estimate the plurality of sounding coordinates based on a machine learning model.

3. The information processing device according to claim 1, wherein
the circuitry is further configured to estimate the plurality of sounding coordinates to generate the sound image of the object, and
the object serves as a sound source in the video stream.

4. The information processing device according to claim 1, wherein the circuitry is further configured to discriminate the gazing point of the viewer based on a machine learning model.

5. The information processing device according to claim 1, wherein the circuitry is further configured to:
discriminate a gazing degree of the viewer; and
render the video content based on the discriminated gazing degree of the viewer.

6. The information processing device according to claim 5, wherein the circuitry is further configured to render the video content based on a machine learning model.

7. The information processing device according to claim 5, wherein the circuitry is further configured to:
perform at least one of a framing process or a zooming process of the video content; and
render the video content based on the at least one of the performed framing process or the performed zooming process.

8. The information processing device according to claim 5, wherein the circuitry is further configured to:
track the object gazed by the viewer; and
render the video content based on the tracked object.

9. The information processing device according to claim 5, wherein the circuitry is further configured to:
perform at least one of a framing process or a zooming process of the video content; and
estimate the plurality of sounding coordinates based on the video content subjected to the at least one of the framing process or the zooming process.

10. The information processing device according to claim 7, wherein the circuitry is configured to perform the at least one of the framing process or the zooming process of the video content in a stepwise manner or at a specific speed to a target value.

11. The information processing device according to claim 1, wherein the video stream is a stream of three-dimensional (3D) video.

12. The information processing device according to claim 11, wherein
the circuitry is further configured to generate the sound image based on a 3D depth or a direction of 3D display of the object, and
the object serves as a sound source included in the video stream.

13. The information processing device according to claim 11, wherein
the circuitry is further configured to generate the sound image based on a 3D depth and a direction of 3D display of the object, and
the object serves as a sound source included in the video stream.

14. The information processing device according to claim 1, wherein the circuitry is further configured to control a display device to perform three-dimensional (3D) display based on binocular parallax.

15. The information processing device according to claim 1, wherein the circuitry is further configured to:
discriminate the object based on a feature of the object that corresponds to the gazing point;
acquire related information of the discriminate object; and
control an output of the acquired related information together with the video stream.

16. The information processing device according to claim 15, wherein the circuitry is further configured to:
extract the feature of the object based on a first machine learning model; and
acquire the related information based on a second machine learning model.

17. The information processing device according to claim 1, wherein the audio stream includes meta information of object-based audio.

18. An information processing method, comprising:
discriminating a gazing point of a viewer of video content, wherein
the video content includes a video stream and an audio stream, and
the gazing point of the viewer is discriminated based on a state of the viewer;
estimating a plurality of sounding coordinates at which a sound image of an object gazed by the viewer is generated, wherein
the plurality of sounding coordinates is estimated based on the video stream, the audio stream, and the discriminated gazing point;
controlling an output of the video stream; and
controlling an output of the audio stream to generate the sound image at the plurality of sounding coordinates.

* * * * *